(12) United States Patent
Sun et al.

(10) Patent No.: US 12,743,161 B2
(45) Date of Patent: Sep. 22, 2026

(54) DEVICE CONNECTION ESTABLISHMENT METHOD AND TERMINAL DEVICE

(71) Applicant: Honor Device Co., Ltd., Shenzhen (CN)

(72) Inventors: Ke Sun, Shenzhen (CN); Jie Ren, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 0 days.

(21) Appl. No.: 18/721,280

(22) PCT Filed: May 6, 2023

(86) PCT No.: PCT/CN2023/092423
§ 371 (c)(1),
(2) Date: Jun. 18, 2024

(87) PCT Pub. No.: WO2023/241258
PCT Pub. Date: Dec. 21, 2023

(65) Prior Publication Data

US 2025/0053247 A1 Feb. 13, 2025

(30) Foreign Application Priority Data

Jun. 13, 2022 (CN) ........................ 202210662419.8

(51) Int. Cl.
*G06F 3/0354* (2013.01)
*G06F 3/04842* (2022.01)
*G06F 3/14* (2006.01)

(52) U.S. Cl.
CPC ........ *G06F 3/0354* (2013.01); *G06F 3/04842* (2013.01); *G06F 3/1423* (2013.01)

(58) Field of Classification Search
CPC combination set(s) only.
See application file for complete search history.

(56) References Cited

U.S. PATENT DOCUMENTS

| | | | |
|---|---|---|---|
| 12,069,551 | B2 | 8/2024 | Liu et al. |
| 2007/0240073 | A1 | 10/2007 | McCarthy et al. |

(Continued)

FOREIGN PATENT DOCUMENTS

| | | | |
|---|---|---|---|
| CN | 103905092 | A | 7/2014 |
| CN | 110191450 | A | 8/2019 |

(Continued)

*Primary Examiner* — William Boddie
*Assistant Examiner* — Alecia D English
(74) *Attorney, Agent, or Firm* — Conley Rose, P.C.

(57) ABSTRACT

A device connection establishment method and a terminal device. A first terminal moves a cursor to an edge on a first side of a first interface in response to a move operation. Further, the first terminal enters a preset mode in response to a move operation. A first operation performed by a user on an input device can be received. A second terminal performs, in response to a third operation, a function corresponding to the first operation. In addition, the first terminal continuously displays first prompt information to prompt the user that the first terminal and the second terminal start to establish a short-range communication connection, and the second terminal continuously displays second prompt information to prompt the user that the first terminal and the second terminal start to enter the preset mode.

18 Claims, 35 Drawing Sheets

(56) References Cited

U.S. PATENT DOCUMENTS

| | | | | |
|---|---|---|---|---|
| 2009/0298419 | A1* | 12/2009 | Ahya | G01S 5/0072 455/3.06 |
| 2013/0222405 | A1 | 8/2013 | Ademar et al. | |
| 2014/0187164 | A1 | 7/2014 | Yang et al. | |
| 2015/0143266 | A1* | 5/2015 | Strode | G06F 3/04812 715/761 |
| 2017/0311368 | A1* | 10/2017 | Kandur Raja | H04L 12/28 |
| 2017/0351396 | A1* | 12/2017 | Passeri | G06F 3/04845 |
| 2017/0353549 | A1 | 12/2017 | Passeri et al. | |
| 2020/0359083 | A1* | 11/2020 | Chung | G06F 3/0482 |
| 2022/0391158 | A1* | 12/2022 | Lemmens | G06F 3/1438 |
| 2023/0229300 | A1 | 7/2023 | Lu et al. | |
| 2024/0053879 | A1* | 2/2024 | Wang | G06F 3/0486 |
| 2025/0016864 | A1* | 1/2025 | Mou | H04W 76/14 |

FOREIGN PATENT DOCUMENTS

| | | | |
|---|---|---|---|
| CN | 114035721 | A | 2/2022 |
| CN | 114089900 | A | 2/2022 |
| CN | 114089901 | A | 2/2022 |
| JP | H09185483 | A | 7/1997 |
| KR | 20130033671 | A | 4/2013 |

* cited by examiner

CONT. FROM FIG. 19A

CONT. FROM FIG. 20A

230
Chip
Processor
2310
2320
2340
Memory
Communication interface
2330

DEVICE CONNECTION ESTABLISHMENT METHOD AND TERMINAL DEVICE

CROSS-REFERENCE TO RELATED APPLICATIONS

This is a national stage of International Application No. PCT/CN2023/092423, filed on May 6, 2023, which claims priority to Chinese Patent Application No. 202210662419.8, filed on Jun. 13, 2022, both of which are incorporated herein by reference in their entireties.

TECHNICAL FIELD

This application relates to the field of terminal technologies, and in particular, to a device connection establishment method and a terminal device.

BACKGROUND

Currently, with development of terminal technologies, terminal devices have become a part of people's work and life. Some current terminal devices can be connected to an input device such as a mouse or a keyboard, to make it easier for a user to input an operation instruction.

Currently, when a first terminal is connected to an input device such as a mouse or a keyboard, the first terminal also establishes a communication connection to a second terminal by setting the mouse or the keyboard connected to the first terminal, that is, the first terminal and the second terminal share the input device such as the mouse or the keyboard, which can facilitate input of an operation instruction in the second terminal. However, a setting process and a connection interaction manner in a related technology are relatively complex, and operation efficiency is low.

SUMMARY

This application provides a device connection establishment method and a terminal device, so that an operation step through which a user triggers a first terminal to enter a preset mode is convenient and simple, and efficiency is high.

According to a first aspect, this application provides a device connection establishment method, applied to a first terminal and a second terminal. The first terminal is connected to an input device used to input a control instruction. The method provided in this application includes:

The first terminal displays a first interface, and the second terminal displays a second interface, where the first interface includes a cursor; the first terminal moves the cursor to an edge on a first side of the first interface in response to a move operation performed on the cursor toward a first direction; the first terminal starts, in response to a move operation performed on the cursor at the edge on the first side toward the first direction, to establish a short-range communication connection to the discovered second terminal; the first terminal displays first prompt information in the first interface, where the first prompt information is used to indicate to start to establish the short-range communication connection; the first terminal continuously displays the first prompt information in first duration that is after the first terminal starts to display the first prompt information; and after the first duration, the second terminal starts to display second prompt information in the second interface, and the first terminal continues to display the first prompt information, where the second prompt information is used to indicate to start to enter a preset mode; the second terminal displays the cursor in the second interface after successfully entering the preset mode; a first operation performed by a user on the input device is received in the preset mode; and the second terminal performs, in response to the first operation, a function corresponding to the first operation.

According to the device connection establishment method provided in this application, the first terminal moves the cursor to the edge on the first side of the first interface in response to the move operation performed on the cursor toward the first direction. Further, in response to the move operation performed on the cursor at the edge on the first side toward the first direction, the first terminal starts to establish the short-range communication connection to the discovered second terminal. The first terminal displays the first prompt information in the first interface, and after the first duration that is after the first terminal starts to display the first prompt information, the second terminal starts to display the second prompt information in the second interface. In this way, a connection relationship between the first terminal and another device and a connected process node can be intuitively displayed to the user by using the first prompt information and the second prompt information. In addition, a connection process can be implemented by simply performing a move operation on an identifier of a discovered device. Compared with a related technology in which two devices need to be separately set, an operation is more convenient and faster, and experience is good.

In a possible implementation, that the first terminal starts, in response to a move operation performed on the cursor at the edge on the first side toward the first direction, to establish a short-range communication connection to the discovered second terminal includes: The first terminal identifies a direction of the discovered second terminal relative to the first terminal in response to the move operation performed on the cursor at the edge on the first side toward the first direction; and when the first terminal determines that the second terminal is located on the first side of the first terminal, the first terminal starts to establish the short-range communication connection to the second terminal.

In this way, the first terminal may be connected, based on a user requirement, to the second terminal on the first side in the direction in which the cursor moves.

In a possible implementation, after the first terminal identifies the direction of the discovered second terminal relative to the first terminal, the method provided in this application further includes: When the first terminal determines that the second terminal is located on a second side of the first terminal, the first terminal does not start to establish the short-range communication connection to the second terminal.

In this way, when the move operation is performed on the cursor at the edge on the first side toward the first direction (that is, the first side), it indicates that the user has a connection requirement for a device located on the first side of the first terminal. However, if the second terminal is located on the second side of the first terminal, the first terminal does not start to establish the short-range communication connection to the second terminal, to avoid mistakenly establishing the short-range communication connection between the first terminal and the second terminal, which does not meet a device connection requirement of the user.

In a possible implementation, that the first terminal starts, in response to a move operation performed on the cursor at the edge on the first side toward the first direction, to establish a short-range communication connection to the discovered second terminal includes: The first terminal displays, when determining that the first side of the first terminal includes a plurality of second terminals, identifiers of the plurality of discovered second terminals in the first interface of the first terminal; the first terminal receives a trigger operation on a first identifier in the identifiers of the plurality of second terminals; and the first terminal starts, in response to the trigger operation, to establish the short-range communication connection to a second terminal corresponding to the first identifier.

In this way, when the first side in the direction in which the cursor moves includes a plurality of second terminals, the first terminal may select, based on a user requirement, a second terminal to establish the short-range communication connection.

In a possible implementation, that the first terminal displays, when determining that the first side of the first terminal includes a plurality of second terminals, identifiers of the plurality of discovered second terminals in the first interface of the first terminal includes: When the first terminal determines that the first side of the first terminal includes the plurality of second terminals, the first terminal performs location sorting on the identifiers of the second terminals based on priorities of the second terminals, where a sorting location of a second terminal with a higher priority is closer to the middle, or a sorting location of a second terminal with a higher priority is closer to a location of the cursor; and the second terminal displays the identifiers of the plurality of discovered second terminals in the first interface of the first terminal based on the sorting.

It may be understood that, a location closer to the middle of the first interface is a location more convenient for a user to perform an operation, so that it can be more convenient for a user to perform an operation when the sorting location of the second terminal with the higher priority is closer to the middle. In another aspect, a location closer to the cursor in the first interface is a location more convenient for a user to perform an operation, so that it can also be more convenient for a user to perform an operation when the sorting location of the second terminal with the higher priority is closer to the location of the cursor.

In a possible implementation, before the first terminal performs location sorting on the identifiers of the second terminals based on the priorities of the second terminals, the method provided in this application further includes: The first terminal performs priority sorting on the discovered devices, where a rule of the priority sorting is that a second terminal that is connected to the first terminal at an earlier moment last time has a higher priority, or that a second terminal that has been previously connected to the first terminal more times has a higher priority.

It may be understood that, the second terminal that is connected to the first terminal at an earlier moment last time or the second terminal that has been previously connected to the first terminal more times is a device to which the user pays more attention. In this way, it is more convenient for a user to perform an operation at a location sorted for the second terminal based on the determined priority.

In a possible implementation, after the second terminal displays the cursor in the second interface, the first terminal controls the first prompt information to disappear, and the second terminal controls the second prompt information to disappear.

When the first prompt information disappears and the second terminal controls the second prompt information to disappear, the user may be prompted that the first terminal and the second terminal successfully enter the preset mode.

In a possible implementation, the first prompt information is a first brightness bar, and the second prompt information is a second brightness bar.

In a possible implementation, the input device is a keyboard, a mouse, or a touchpad.

According to a second aspect, this application further provides a terminal device, including a processor and a memory. The memory is configured to store code instructions. The processor is configured to run the code instructions to enable an electronic device to perform the method performed by the first terminal or the second terminal described in any one of the first aspect or the implementations of the first aspect.

According to a third aspect, this application further provides a computer-readable storage medium. The computer-readable storage medium stores instructions, and when the instructions are executed, a computer is enabled to perform the method performed by the first terminal or the second terminal described in any one of the first aspect or the implementations of the first aspect.

According to a fourth aspect, this application further provides a computer program product, including a computer program. When the computer program is run, a computer is enabled to perform the method performed by the first terminal or the second terminal described in any one of the first aspect or the implementations of the first aspect.

It should be understood that, the second aspect to the fourth aspect of this application correspond to the technical solution of the first aspect of this application, and the beneficial effects achieved by each aspect and the corresponding feasible implementations are similar. Details are not described again.

DESCRIPTION OF EMBODIMENTS

To clearly describe the technical solutions in the embodiments of this application, in the embodiments of this application, words such as "first" and "second" are used to distinguish between same items or similar items with basically the same functions and effects. For example, a first value and a second value are merely intended to distinguish between different values, but not to limit a sequential order thereof. A person skilled in the art may understand that the words such as "first" and "second" do not limit a quantity and an execution sequence, and the words such as "first" and "second" do not indicate a definite difference.

It should be noted that, in this application, a word such as "example" or "for example" is used to represent giving an example, an illustration, or a description. Any embodiment or design solution described as "example" or "for example" in this application should not be explained as being more preferred or having more advantages than other embodiments or design solutions. Exactly, the words such as "example" or "for example" are used to present related concepts in a specific manner.

In this application, "at least one" means one or more, and "a plurality of" means two or more. "And/Or" describes an association relationship between associated objects, and represents that three relationships may exist. For example, "A and/or B" may represent the following cases: Only A exists, both A and B exist, and only B exists, where A and B may be singular or plural. The character "/" usually represents an "or" relationship between associated objects. "At least one of the following items" or a similar expression thereof means any combination of these items, including a single item or any combination of a plurality of items. For example, at least one of a, b, or c may represent a, b, c, a-b, a-c, b-c, or a-b-c, where a, b, and c may be singular or plural.

Currently, with development of terminal technologies, terminal devices have become a part of people's work and life. Some current terminal devices can be connected to an input device such as a mouse, a keyboard, or a touchpad, to help a user input an operation instruction.

When a first terminal is connected to an input device such as a mouse or a keyboard, if a user wants to share a function of the input device such as the mouse or the keyboard with a second terminal, the user may establish a short-range communication connection between the first terminal and the second terminal, so that the first terminal enters an operation sharing mode. When the first terminal is in the operation sharing mode, the user may conveniently input an operation instruction in the second terminal by using the first terminal.

Figure 1A:
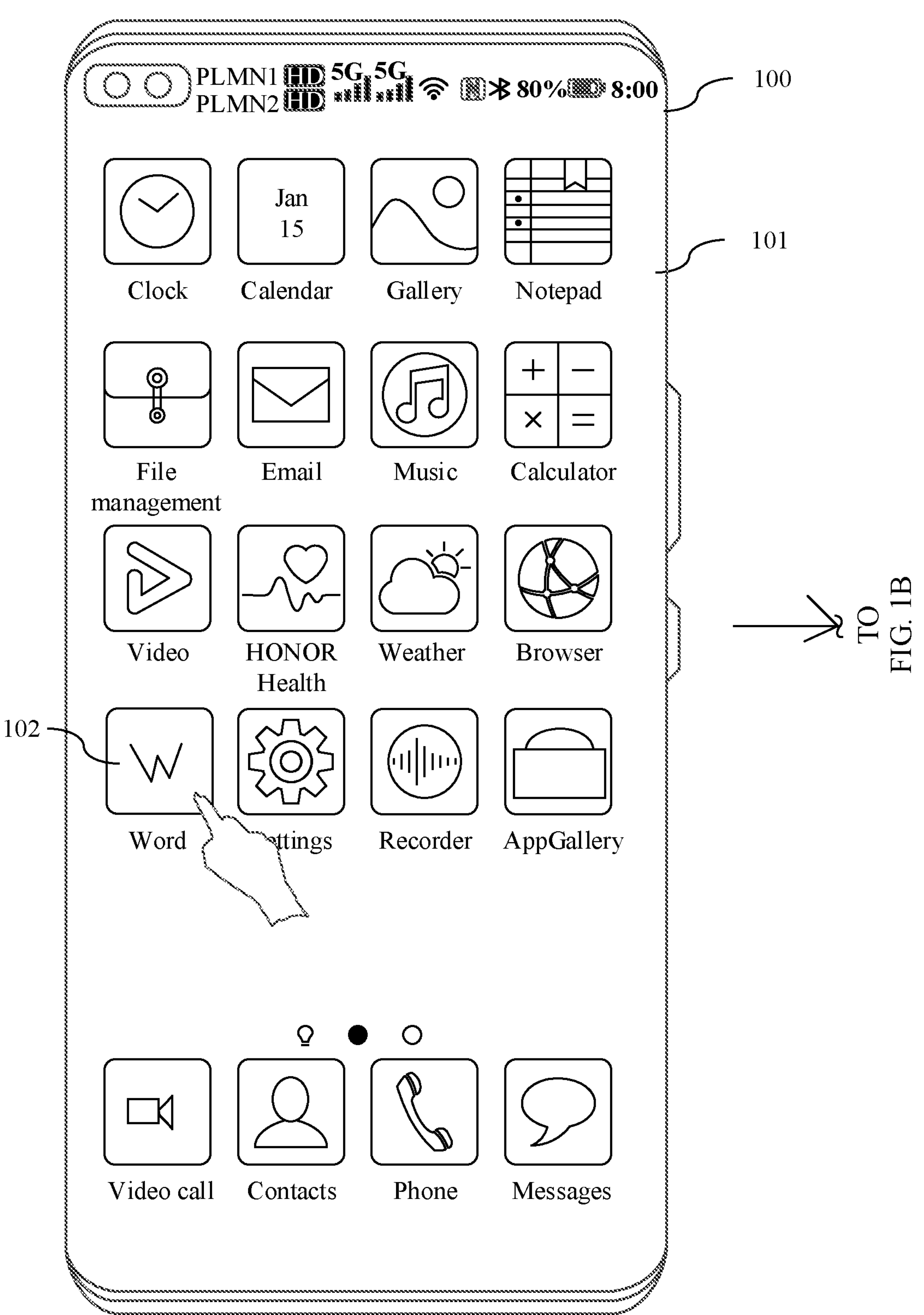
FIG. 1A and FIG. 1B are schematic diagrams of interfaces in which a mobile phone displays a word editing interface in response to a trigger operation on a word icon.
Figure 1B:
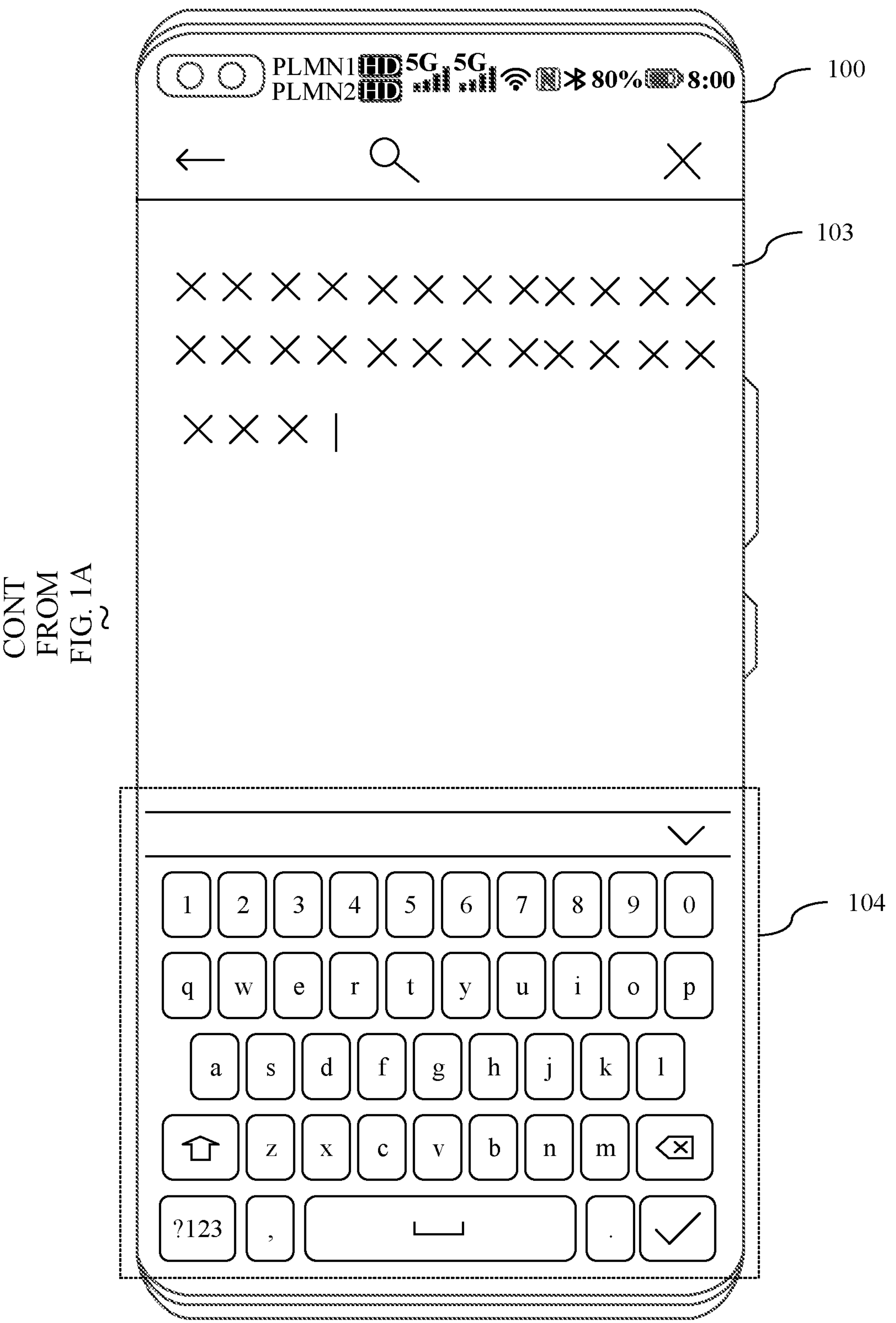

For example, when the first terminal is a notebook computer and the second terminal is a mobile phone, as shown in FIG. 1A, a mobile phone 100 may display a home screen 101, and the home screen 101 includes a word icon 102. As shown in FIG. 1B, the mobile phone 100 may display a word editing interface 103 in response to a trigger operation on the word icon 102. The mobile phone 100 may display an interface 104 of a text input method application when an editing area in the editing interface 103 is tapped. In this way, the user can input data through the interface 104 of the text input method application to edit a word document.

In a related technology, a mouse or a keyboard connected to a notebook computer is set to establish a connection between the notebook computer and a mobile phone, that is, the mobile phone and the notebook computer share the mouse or the keyboard, so that it can be convenient to edit a word document on the mobile phone. However, a setting process and a connection interaction manner in the related technology are relatively complex.

In view of this, this application provides a device connection establishment method. According to the device connection establishment method provided in this application, a first terminal moves a cursor to an edge on a first side of a first interface in response to a move operation performed on the cursor toward a first direction. Further, the first terminal enters a preset mode in response to a move operation performed on the cursor at the edge on the first side toward the first direction, and the operation is convenient and fast. In this way, a first operation performed by a user on an input device can be received. A second terminal performs, in response to a third operation, a function corresponding to the first operation. In addition, the first terminal continuously displays first prompt information to prompt the user that the first terminal and the second terminal start to establish a short-range characteristic connection; and the second terminal continuously displays the first prompt information to prompt the user that the first terminal and the second terminal start to enter the preset mode.

It may be understood that, the first terminal may be a device, such as a notebook computer or a desktop computer, that has a peripheral input device such as a mouse, a keyboard, and/or a touchpad. A specific technology and a specific device form used for the first terminal are not limited in embodiments of this application.

To better understand the embodiments of this application, the following describes a structure of the first terminal in the embodiments of this application. For example, FIG. 2 is a schematic diagram of a structure of a first terminal according to an embodiment of this application.

It may be understood that, the first terminal may be a device, such as a notebook computer or a desktop computer, that is connected to an input device such as a mouse, a keyboard, and/or a touchpad. A specific technology and a specific device form used for the first terminal are not limited in embodiments of this application.

To better understand the embodiments of this application, the following describes a structure of the first terminal in the embodiments of this application. For example, FIG. 2 is a schematic diagram of a structure of a first terminal according to an embodiment of this application.

Figure 2:
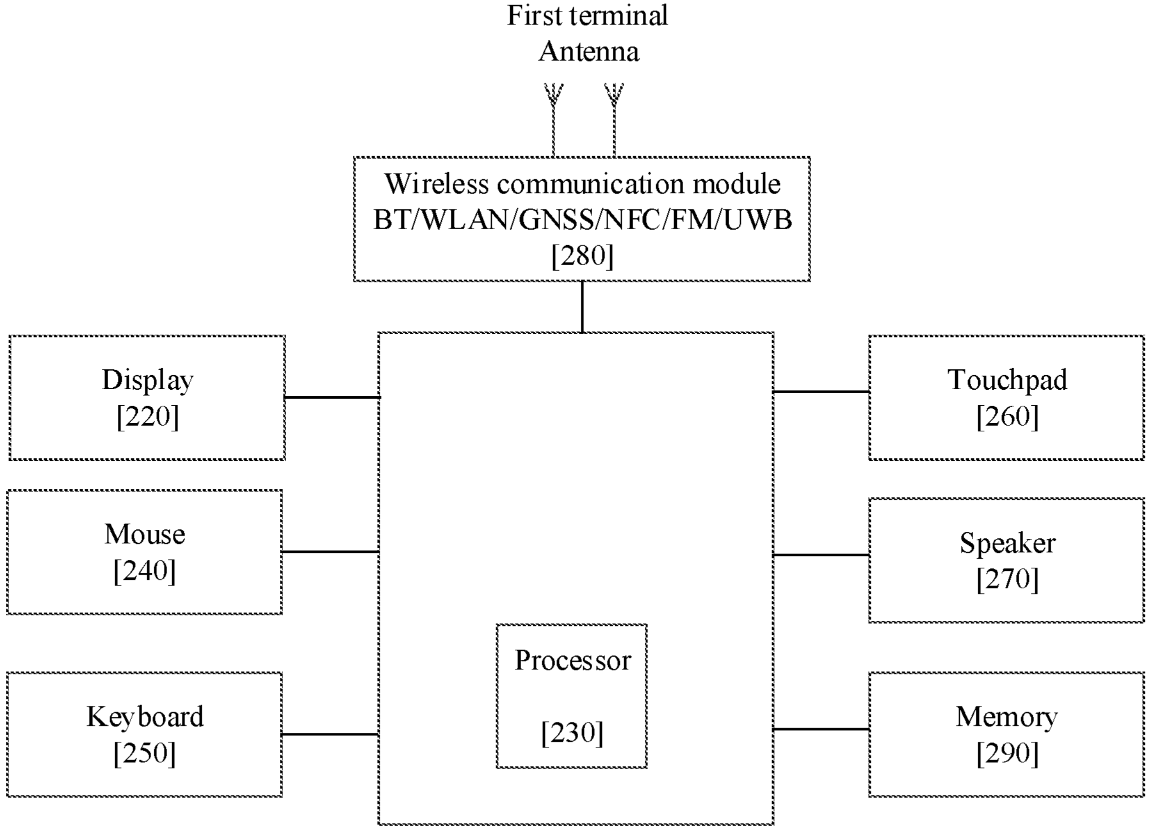
FIG. 2 is a block diagram of a structure of a notebook computer according to an embodiment of this application.

FIG. 2 is a schematic diagram of a hardware structure of a first terminal according to an embodiment of this application. With reference to FIG. 2, the first terminal may include a plurality of subsystems. These subsystems cooperate to perform, coordinate, or monitor one or more operations or functions of the first terminal. The first terminal includes a display 220, a processor 230, a mouse 240, a keyboard 250, a touchpad 260, a speaker 270, a wireless communication module 280, and a memory 290.

A wireless communication function of the first terminal may be implemented by using an antenna, the wireless communication module 280, a modem processor, a baseband processor, and the like. The antenna is configured to transmit and receive electromagnetic wave signals. The antenna in the first terminal may be configured to cover one or more communication bands. Different antennas may be further multiplexed to improve antenna utilization.

The wireless communication module 280 may provide a wireless communication solution that is applied to the first terminal and that includes a wireless local area network (WLAN) (for example, a wireless fidelity (Wi-Fi) network), Bluetooth (BT), a global navigation satellite system (GNSS), frequency modulation (FM), or an ultra wide band (UWB) connection.

The processor 230 may be implemented as any electronic device capable of processing, receiving, or sending data or instructions. For example, the processor may be a microprocessor, a central processing unit, an application-specific integrated circuit, a field-programmable gate array, a digital signal processor, an analog circuit, a digital circuit, or a combination of these devices. The processor may be a single-thread processor or a multi-thread processor. The processor may be a single-core processor or a multi-core processor.

During use, the processor 230 may be configured to access a memory that stores instructions. The instructions may be configured to enable the processor to perform, coordinate, or monitor one or more operations or functions of the first terminal.

The display 220 may be located behind an input surface 220, or may be integrated with the input surface 220. The display 220 may be communicatively coupled to the processor 230. The processor 230 may present information to a user by using the display 220. In many cases, the processor 230 presents, by using the display 220, an interface through which the user can interact with the processor 230.

The mouse 240 is connected to the first terminal through a USB interface of the first terminal, or may be communicatively connected to the first terminal by using the wireless communication module 280. The first terminal may move a location of a cursor on the display 220 in response to an operation of moving the mouse 240 by a user.

The mouse 240 may move the location of the cursor on the display 220 in response to a move operation of a user.

The keyboard 250 may be integrated into the first terminal, may be connected to the first terminal through the USB interface of the first terminal, or may be communicatively connected to the first terminal by using the wireless communication module 280. In response to a trigger operation performed by a user on the keyboard 250, the first terminal may input an operation instruction (such as a carriage return instruction or a space instruction) on the display 220, or may input text data on the display.

For the touchpad 260, the first terminal may move, in response to a slide operation performed by a user on the touchpad, the cursor displayed on the display 220.

The speaker 270, also referred to as a “loudspeaker”, is configured to convert an audio electrical signal into a sound signal. The first terminal may listen to music or emit an ultrasonic wave by using the speaker 270. In this embodiment of this application, a speaker 270 may be disposed on each of two sides of the first terminal, to help the first terminal determine a direction of a discovered device relative to the first terminal.

The memory 290 may be configured to store computer-executable program code, and the executable program code includes instructions. For example, the memory may be implemented as a random access memory, a read-only memory, a flash memory, a removable memory, another type of storage element, or a combination of these devices. The memory 290 may include a program storage area and a data storage area. The memory 290 may store data in the data storage area. For example, the memory 290 stores information such as identity information and a connection moment of a device to which the first terminal establishes a short-range communication connection.

The technical solutions in this application and how the technical solutions in this application resolve the foregoing technical problem are described in detail below with reference to specific embodiments by using an example in which a first terminal is a notebook computer 200 and a second terminal is a mobile phone 100 and/or a tablet computer 300. The following several specific embodiments may be implemented independently, or may be combined with each other. For same or similar concepts or processes, details may not be described again in some embodiments.

Figure 3:
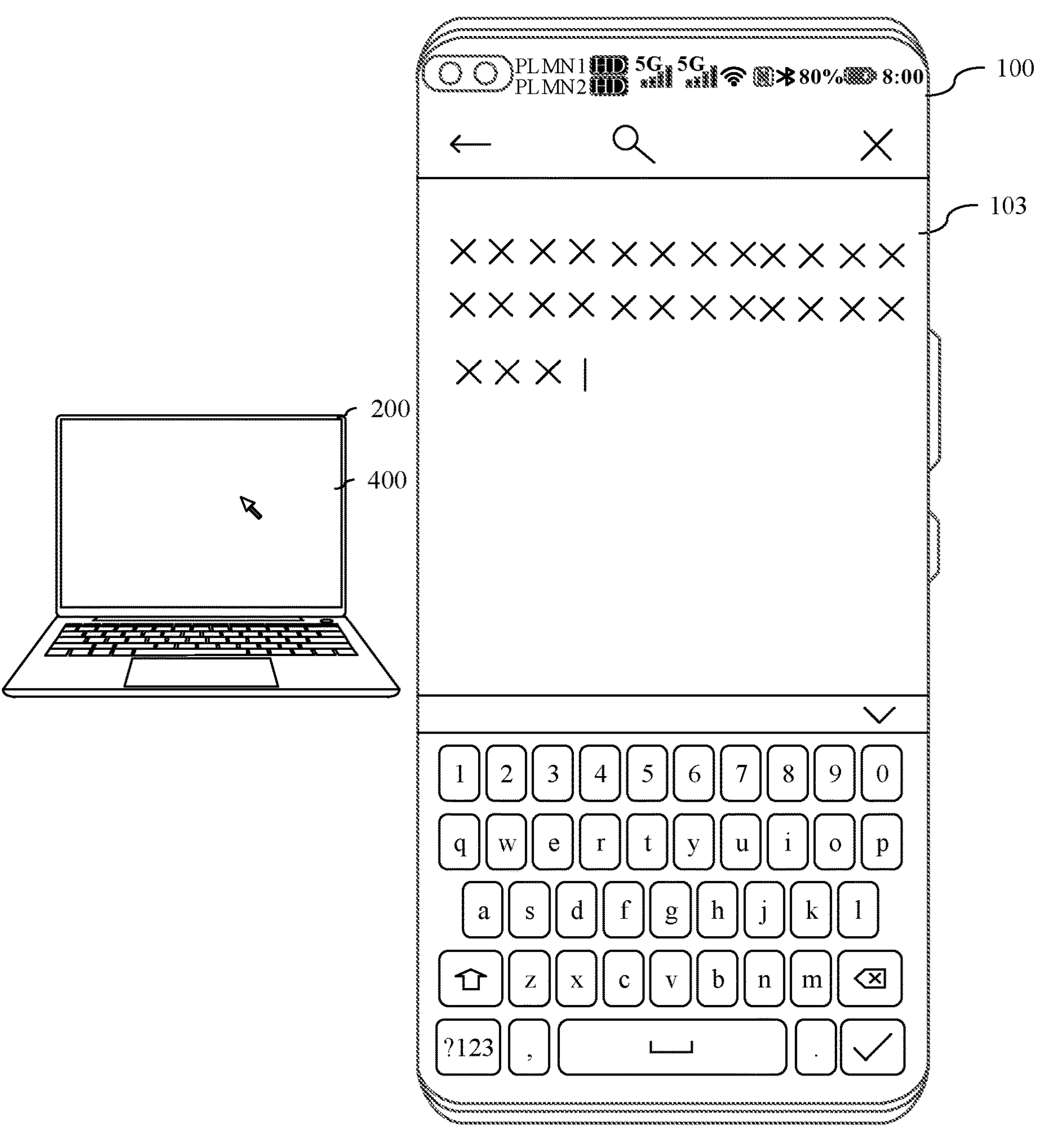
FIG. 3 is a schematic diagram of a location relationship between a notebook computer and a mobile phone according to an embodiment of this application.

As shown in FIG. 3, the device connection establishment method provided in embodiments of this application includes: The notebook computer 200 displays a first interface 400. The first interface 400 may be a home screen of an operating system of the notebook computer 200, an interface of an application program, or the like. This is not limited herein. The first interface 400 includes a cursor of a mouse of the notebook computer 200, and the cursor of the mouse is located in the middle of the first interface 400. It may be understood that, the location of the cursor of the mouse is a focus location used to input an instruction or data.

The mobile phone 100 is located on a right side of the notebook computer 200. The mobile phone 100 displays a word editing interface 103 (that is, a second interface), and the word editing interface 103 may also be referred to as a text input interface.

Figure 4A:
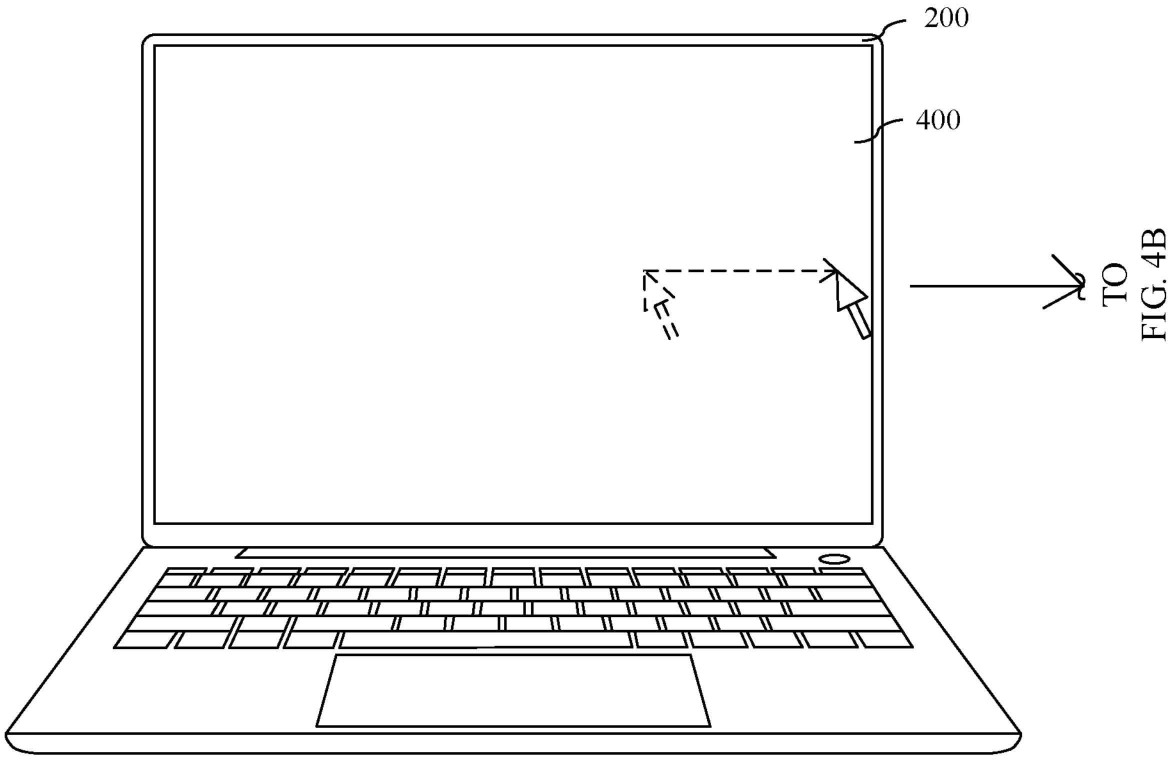
FIG. 4A to FIG. 4C are first schematic diagrams of interfaces in which a notebook computer performs device discovery according to an embodiment of this application.
Figure 4B:
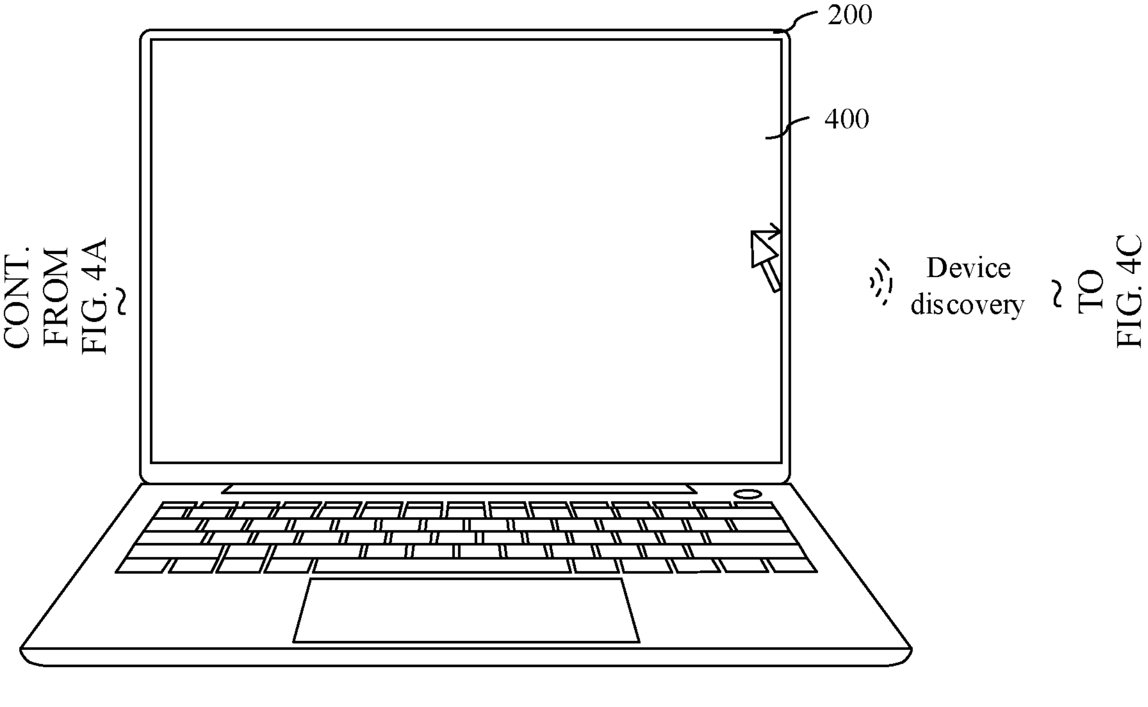
Figure 4C:
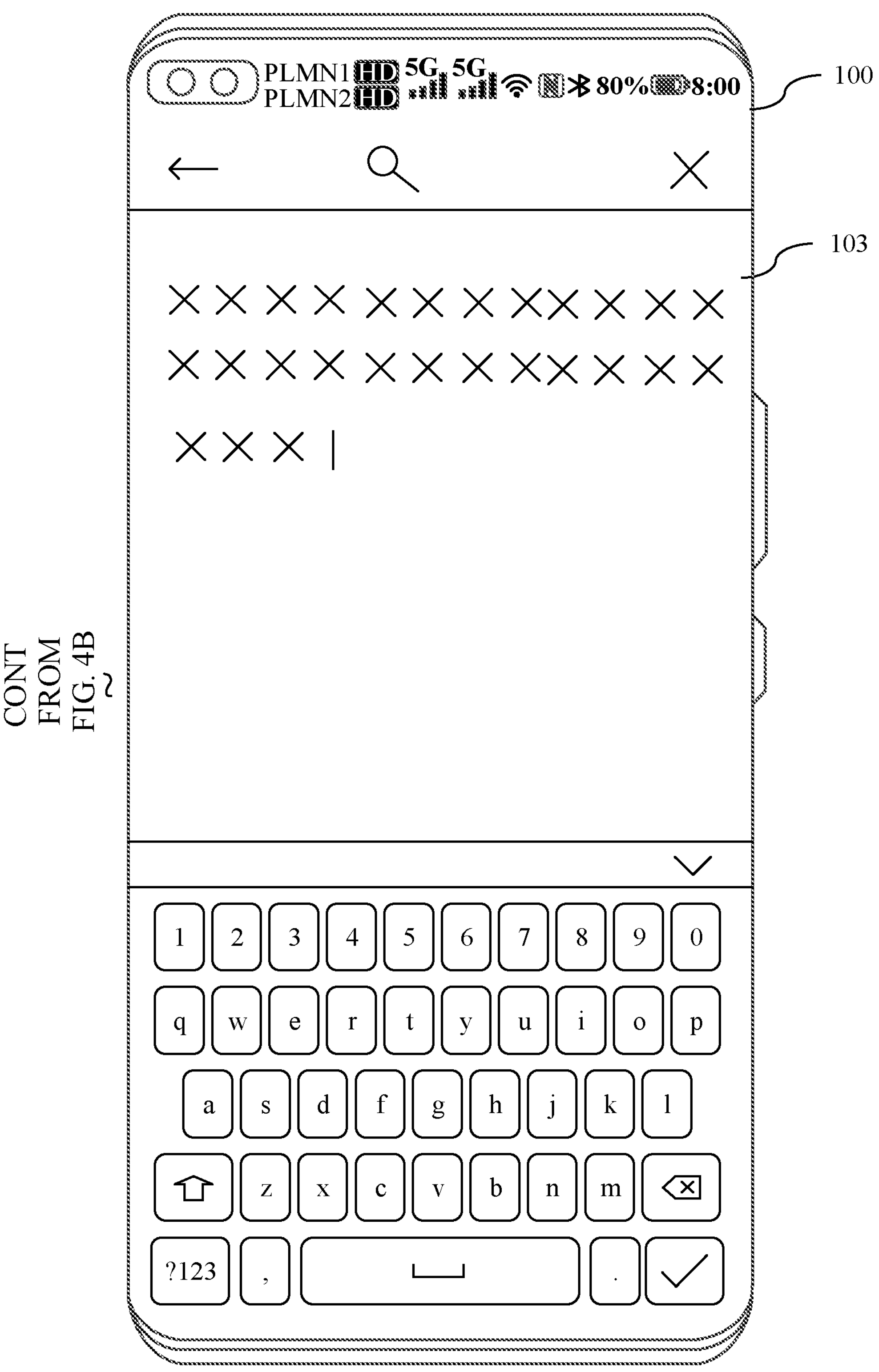

As shown in FIG. 4A, the notebook computer 200 may move the cursor of the mouse to an edge on a right side (that is, a first side) of the first interface 400 of the notebook computer 200 in response to an operation of moving the cursor of the mouse to the right. Further, as shown in FIG. 4B, the notebook computer 200 further performs device discovery in response to an operation of moving, by a user to the right, the cursor of mouse at the edge on the right side of the first interface 400 of the notebook computer 200. As shown in FIG. 4B-FIG. 4C, the notebook computer 200 discovers the mobile phone 100.

To be specific, the notebook computer 200 may move, in response to a move operation performed on the cursor of the mouse toward a direction of the mobile phone 100, the cursor of the mouse to an edge on a side that is of the first interface 400 of the notebook computer 200 and that is close to the mobile phone 100. Further, the notebook computer 200 performs device discovery in response to a move operation (that is, a move operation performed on the cursor outward along the edge of the first interface 400) performed on the cursor of the mouse at the edge toward the direction of the mobile phone 100.

Further, when the notebook computer 200 discovers the mobile phone 100, the notebook computer 200 may identify a direction of the mobile phone 100 relative to the notebook computer 200.

For example, a manner in which the notebook computer 200 identifies the direction of the mobile phone 100 relative to the notebook computer 200 may be as follows.

Figure 5A:
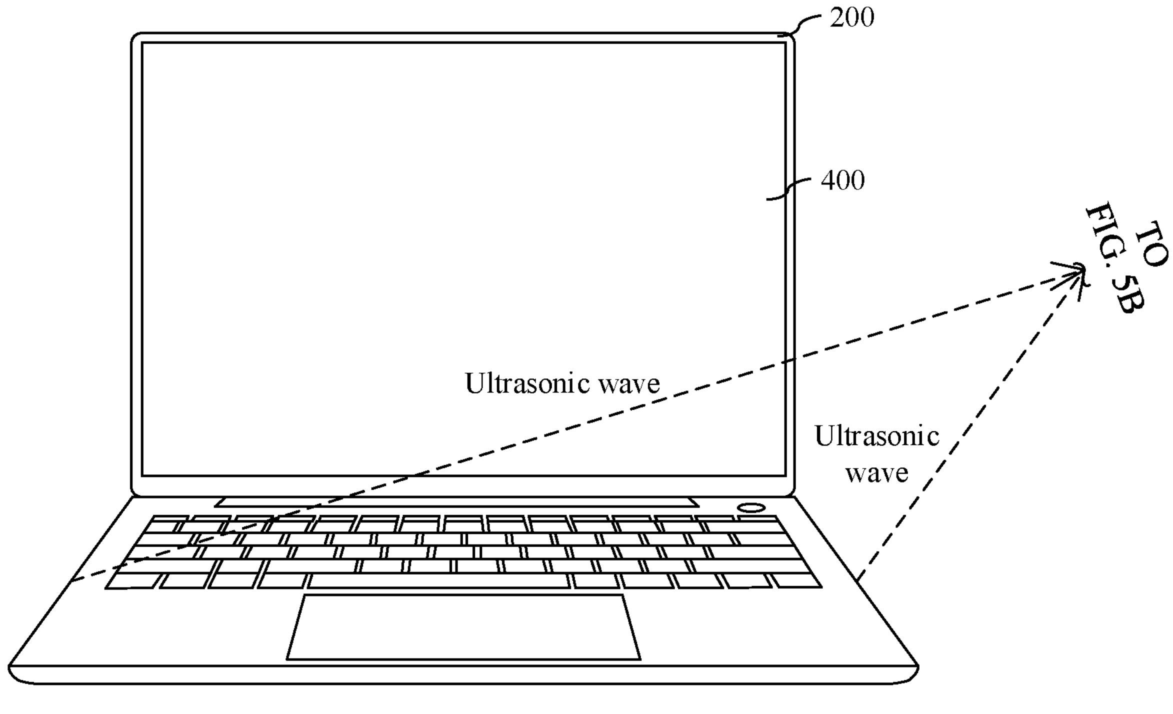
FIG. 5A and FIG. 5B are diagrams of a principle used by a notebook computer to identify a direction of a mobile phone according to an embodiment of this application.

For example, a speaker is disposed on both a left side and the right side of the notebook computer 200. When the notebook computer 200 discovers the mobile phone 100, as shown in FIG. 5A, the speaker on the left side of the notebook computer 200 emits an ultrasonic wave of a first frequency, and the speaker on the right side of the notebook computer 200 emits an ultrasonic wave of a second frequency. Both the ultrasonic wave of the first frequency and the ultrasonic wave of the second frequency carry a physical address of the notebook computer 200. Because the mobile phone 100 is located on the right side of the notebook computer 200, the mobile phone 100 receives the ultrasonic wave of the second frequency before receiving the ultrasonic wave of the first frequency. Further, the mobile phone 100 may feed back a first indication to the notebook computer 200 based on the physical address carried by the ultrasonic wave of the second frequency, where the first indication is used to indicate that the ultrasonic wave of the second frequency is received before the ultrasonic wave of the first frequency is received. The notebook computer 200 determines, based on the first indication, that the mobile phone 100 is located on the right side of the notebook computer 200.

Figure 6A:
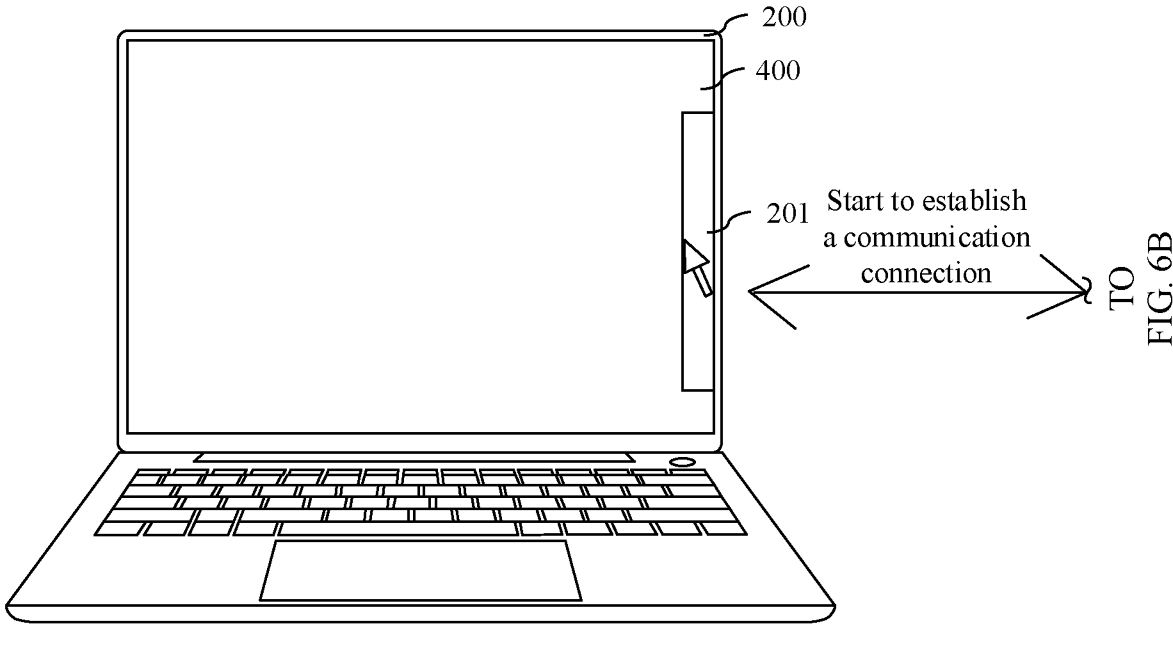
FIG. 6A and FIG. 6B are first schematic diagrams of interfaces in which a notebook computer starts to establish a short-range communication connection to a mobile phone according to an embodiment of this application.

In this case, the notebook computer 200 starts to establish a short-range communication connection to the mobile phone 100. For example, after the notebook computer 200 starts to establish the short-range communication connection to the tablet computer 300, as shown in FIG. 6A, the notebook computer 200 displays a first brightness bar 201 at the edge on the right side of the first interface 400. The first brightness bar 201 may be understood as first prompt information used to indicate that the notebook computer 200 is establishing the short-range communication connection to the mobile phone 100 located on the right side. In addition, the first prompt information may alternatively be an icon and identity information of the mobile phone 100, text information "start to establish a connection to the mobile phone on the right side", or the like. This is not limited herein. Moreover, the first brightness bar 201 may alternatively be at another location in the first interface 400 of the notebook computer 200. This is not limited herein.

It should be noted that, in this embodiment of this application, the foregoing steps through which the notebook computer 200 identifies the direction of the mobile phone 100 relative to the notebook computer 200 may also be omitted. This is not limited herein.

In some embodiments, a process of establishing the short-range communication connection between the notebook computer 200 and the mobile phone 100 may be as followings: The notebook computer 200 sends a first request to the mobile phone 100, where the first request is used to request to establish the short-range communication connection, and the first request carries identity information (such as the physical address) of the notebook computer 200. The mobile phone 100 determines, in response to the first request, whether the identity information of the notebook computer 200 is recorded. When the identity information of the notebook computer 200 is recorded, it indicates that the mobile phone 100 has been previously connected to the notebook computer 200, and the mobile phone 100 feeds back a response message to the notebook computer 200. In this way, data security of the notebook computer 200 can be improved. When the mobile phone 100 does not record the identity information of the notebook computer 200, the mobile phone 100 may display third prompt information (not shown in the accompanying drawings), where the third prompt information is used to indicate to establish the short-range communication connection to the notebook computer 200. The mobile phone 100 feeds back the response message to the notebook computer 200 only when responding to a confirm operation on the third prompt information. In this way, data security of the notebook computer 200 can be improved. When receiving the response message fed back by the mobile phone 100, the notebook computer 200 establishes the short-range communication connection to the mobile phone 100.

In some other embodiments, a process of establishing the short-range communication connection between the notebook computer 200 and the mobile phone 100 may be as follows: The notebook computer 200 sends a first request to the mobile phone 100, where the first request is used to request to establish the short-range communication connection, and the first request carries a user account for logging in to the notebook computer 200.

The mobile phone 100 determines, in response to the first request, whether a user account for logging in to the mobile phone 100 is consistent with the user account for logging in to the notebook computer 200. When the user account for logging in to the mobile phone 100 is consistent with the user account for logging in to the notebook computer 200, it indicates that the mobile phone 100 and the notebook computer 200 belong to a same user. Further, the mobile phone 100 feeds back a response message to the notebook computer 200. In this way, data security of the notebook computer 200 can be improved. When the user account used for logging in to the mobile phone 100 is inconsistent with the user account for logging in to the notebook computer 200, the mobile phone 100 may display third prompt information, where the third prompt information is used to indicate to establish the short-range communication connection to the notebook computer 200. The mobile phone 100 feeds back the response message to the notebook computer 200 only when responding to a confirm operation on the third prompt information. In this way, data security of the notebook computer 200 can be improved. When receiving the response message fed back by the mobile phone 100, the notebook computer 200 establishes the short-range communication connection to the mobile phone 100.

The short-range communication connection may be a wifi connection, a Bluetooth connection, an ultra wide band (ultra wide band, UWB) connection, or the like. This is not limited herein.

Further, the notebook computer 200 successfully establishes the short-range communication connection to the mobile phone 100.

It should be noted that, it may need to take 2 s-3 s, for example, 2.5 s, from that the notebook computer 200 starts to establish the short-range communication connection to the mobile phone 100 to that the notebook computer 200 successfully establishes the short-range communication connection to the mobile phone 100.

Figure 7A:
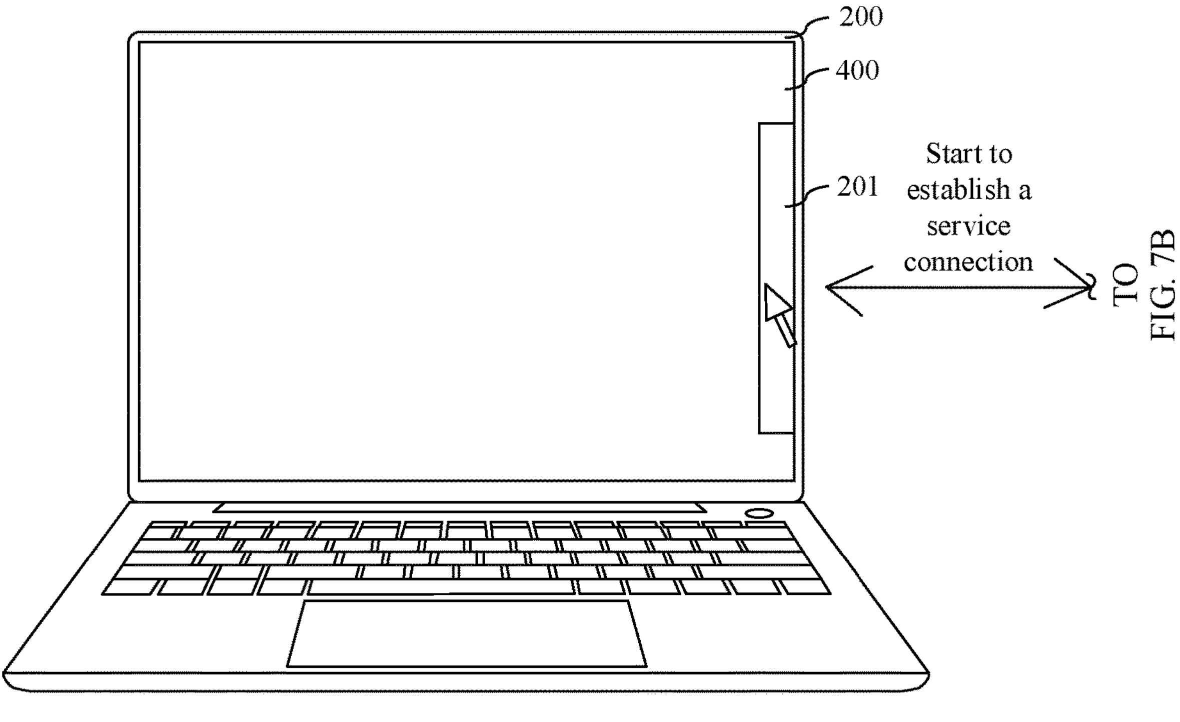
FIG. 7A and FIG. 7B are first schematic diagrams of interfaces in which a notebook computer starts to enter a preset mode according to an embodiment of this application.

After the notebook computer 200 establishes the short-range communication connection to the mobile phone 100, as shown in FIG. 7A, the notebook computer 200 starts to establish a "service connection" to the mobile phone 100. After completing the "service connection", the notebook computer 200 enters a preset mode. The preset mode may also be referred to as an input device sharing mode, a keyboard and mouse sharing mode, or the like. This is not limited herein. In the preset mode, the notebook computer 200 has a function of sharing an input device with the mobile phone 100, and therefore a process in which the notebook computer 200 enters the preset mode may be understood as a process in which the notebook computer 200 establishes the "service connection" to the mobile phone 100.

Figure 7B:
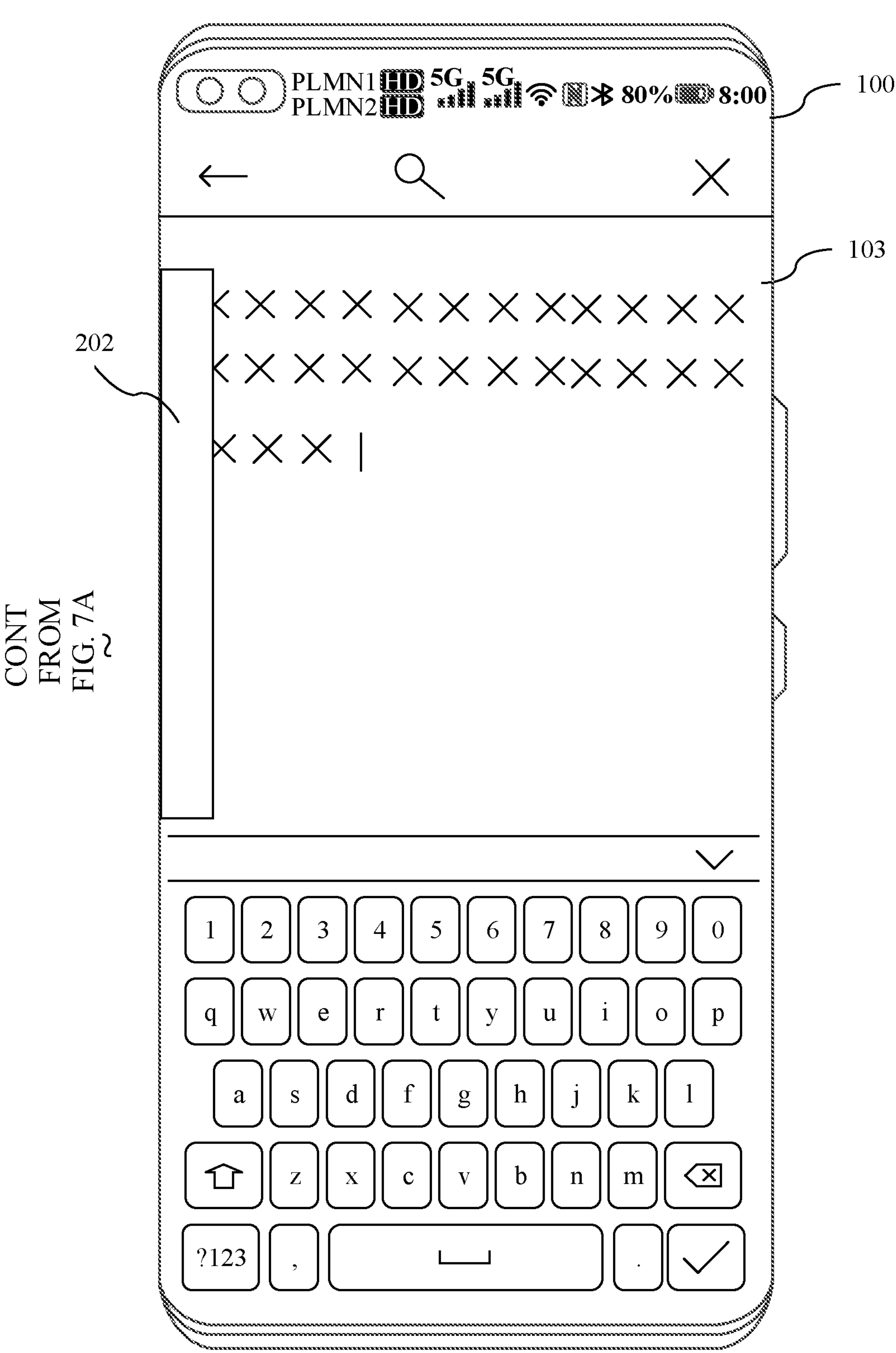

A specific process in which the notebook computer 200 establishes the "service connection" to the mobile phone 100 may be as follows: The notebook computer 200 sends first information to the mobile phone 100. Still as shown in FIG. 7B, after receiving the first information, the mobile phone 100 displays a second brightness bar 202 at an edge on a left side of the mobile phone 100. The second brightness bar 202 may be understood as second prompt information used to indicate the notebook computer 200 to establish the "service connection" to the mobile phone 100. In addition, the second prompt information may alternatively be text information "start to enter the keyboard and mouse sharing mode" displayed on the notebook computer 200 or the mobile phone 100. This is not limited herein. Moreover, the second brightness bar 202 may alternatively be at another location in the word editing interface 103 of the mobile phone 100. This is not limited herein.

Further, the notebook computer 200 successfully establishes the "service connection" to the mobile phone 100. It should be noted that, it needs to take 0.3 s-0.5 s from that the notebook computer 200 starts to enter the preset mode to that the notebook computer 200 successfully enters the preset mode.

Figure 8A:
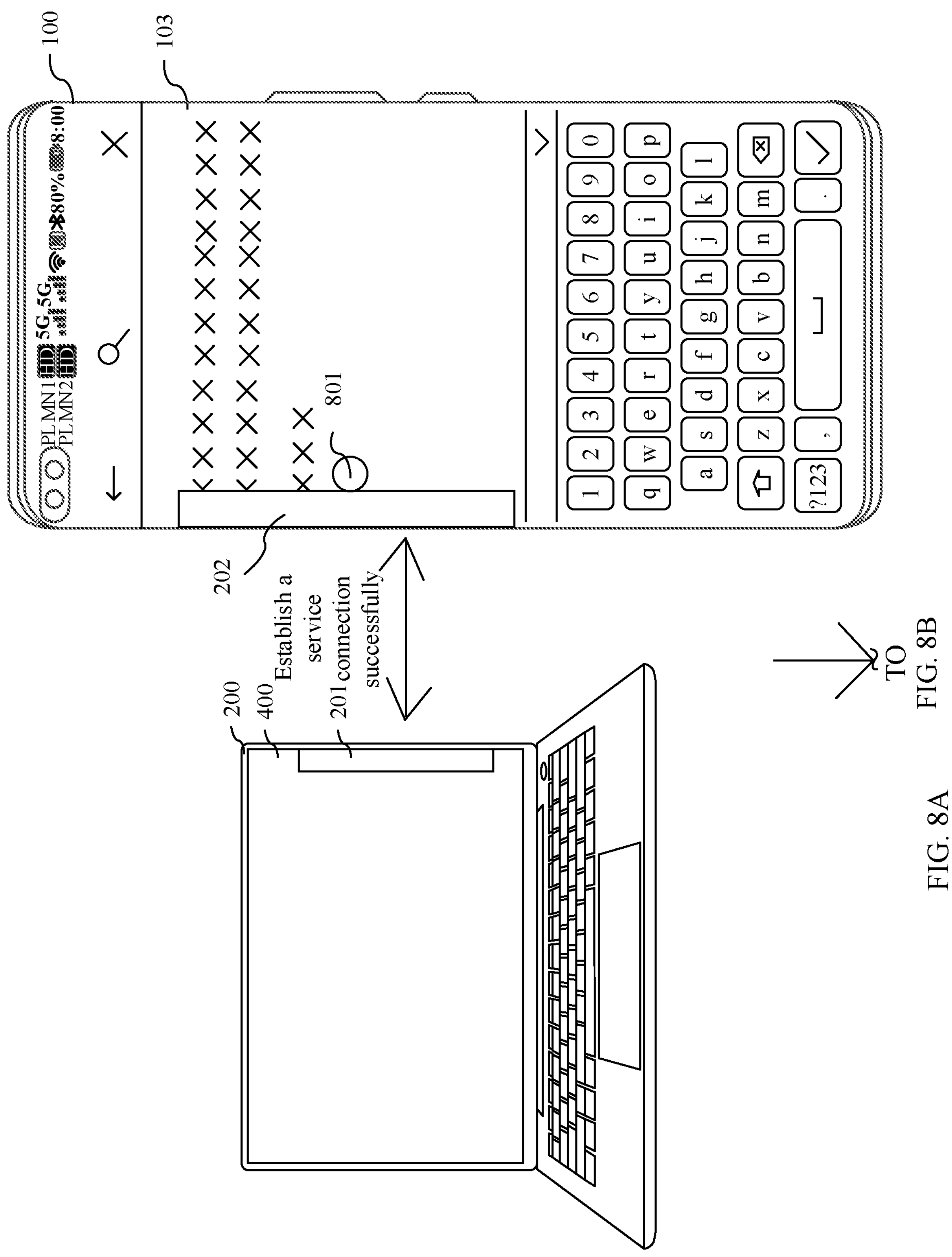
FIG. 8A and FIG. 8B are schematic diagrams of interfaces displayed when a cursor of a mouse is automatically displayed on a mobile phone according to an embodiment of this application.
Figure 8B:
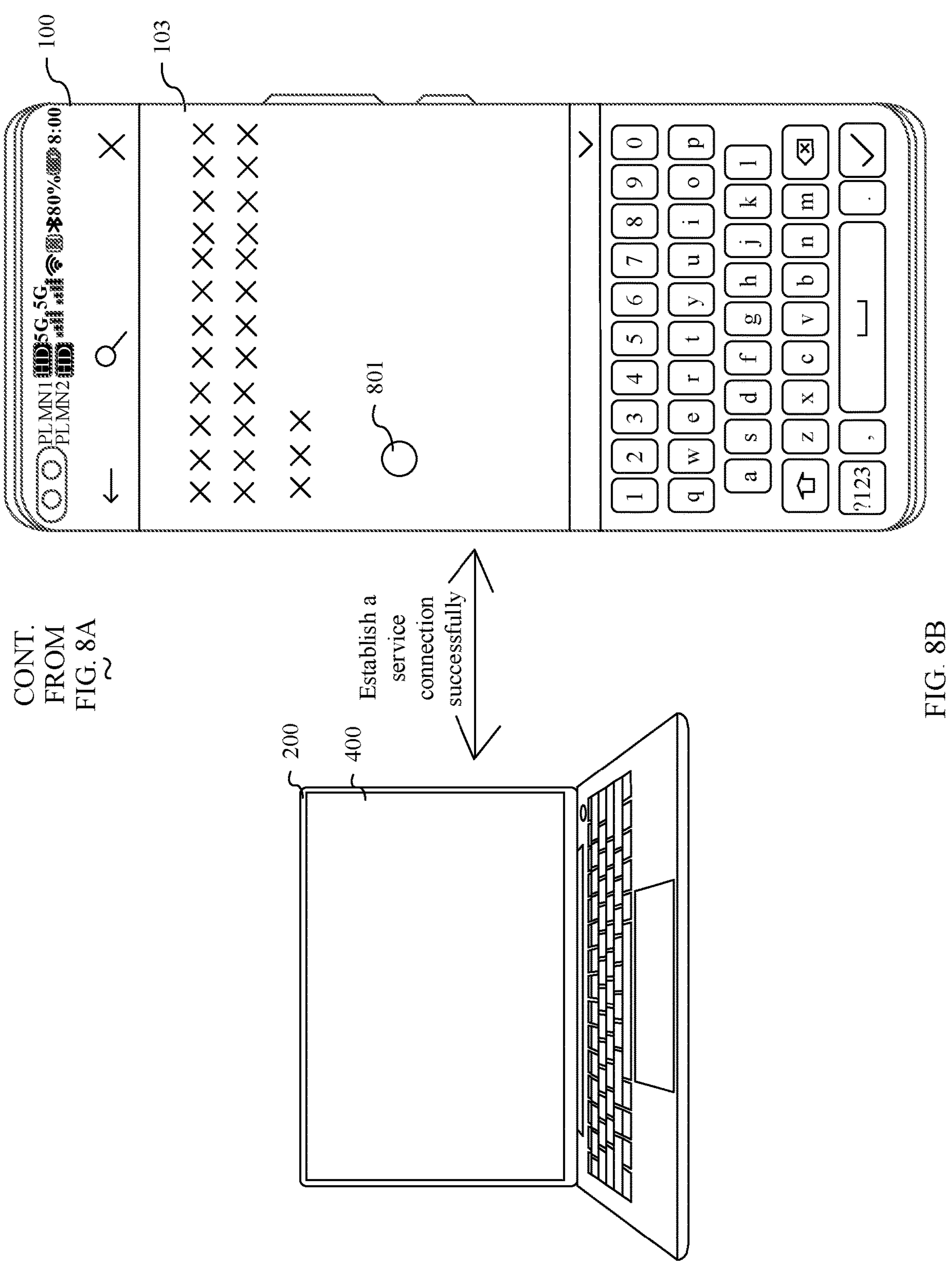

As shown in FIG. 8A, after the notebook computer 200 successfully enters the preset mode, the mobile phone 100 displays the cursor in a display interface, and a location of the cursor may be at an edge of the second brightness bar 202. Then, as shown in FIG. 8B, the notebook computer 200 may cancel display of the first brightness bar 201, and the mobile phone 100 cancels display of the second brightness bar 202. After the first brightness bar 201 and the second brightness bar 202 disappear, a user can be prompted that the notebook computer 200 successfully enters the preset mode.

In addition, the notebook computer 200 may further control the word editing interface 103 of the mobile phone 100 to display the cursor of the mouse. For example, a scenario in which the notebook computer 200 controls the mobile phone 100 to display the cursor of the mouse includes but is not limited to the following two types:

Type 1: As shown in FIG. 7A and FIG. 7B, in a process in which the notebook computer 200 enters the preset mode, if the cursor of the mouse still stays at the edge on the right side of the first interface 400 of the notebook computer 200, it indicates that a user wants to perform an input operation on the mobile phone 100 by using an input device such as a keyboard or the mouse of the notebook computer 200. In this case, still as shown in FIG. 8A, after the notebook computer 200 successfully enters the preset mode, the notebook computer 200 controls the cursor of the mouse displayed at the edge on the right side of the first interface 400 to disappear, and sends second information to the mobile phone 100. The second information is used to indicate the mobile phone 100 to display the cursor of the mouse. After receiving the second information, the mobile phone 100 displays the cursor of the mouse in the word editing interface 103 of the mobile phone 100. The cursor of the mouse may be an arrow in the first interface 400 of the notebook computer 200. When the cursor of the mouse is displayed in the word editing interface 103 of the mobile phone 100, the cursor may switch from the arrow to a dot 801. Further, as shown in FIG. 8B, the notebook computer 200 cancels display of the first brightness bar 201 and controls the mobile phone 100 to cancel display of the second brightness bar 202.

Figure 9A:
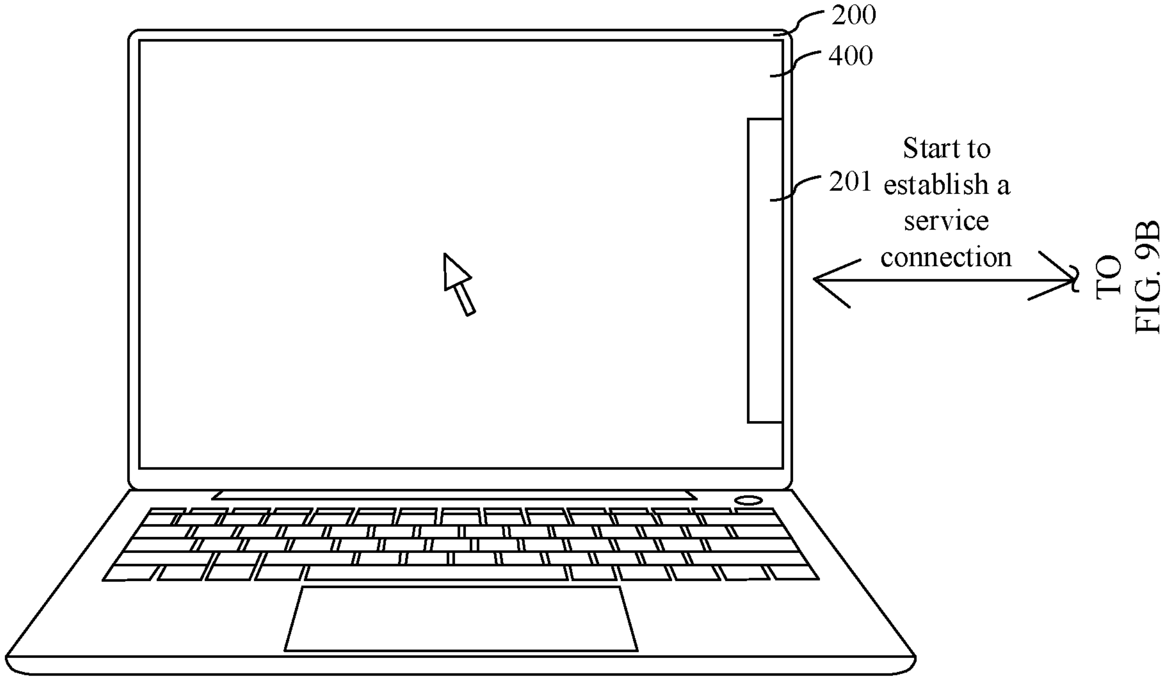
FIG. 9A and FIG. 9B are second schematic diagrams of interfaces in which a notebook computer starts to enter a preset mode according to an embodiment of this application.
Figures 9A, 9B:
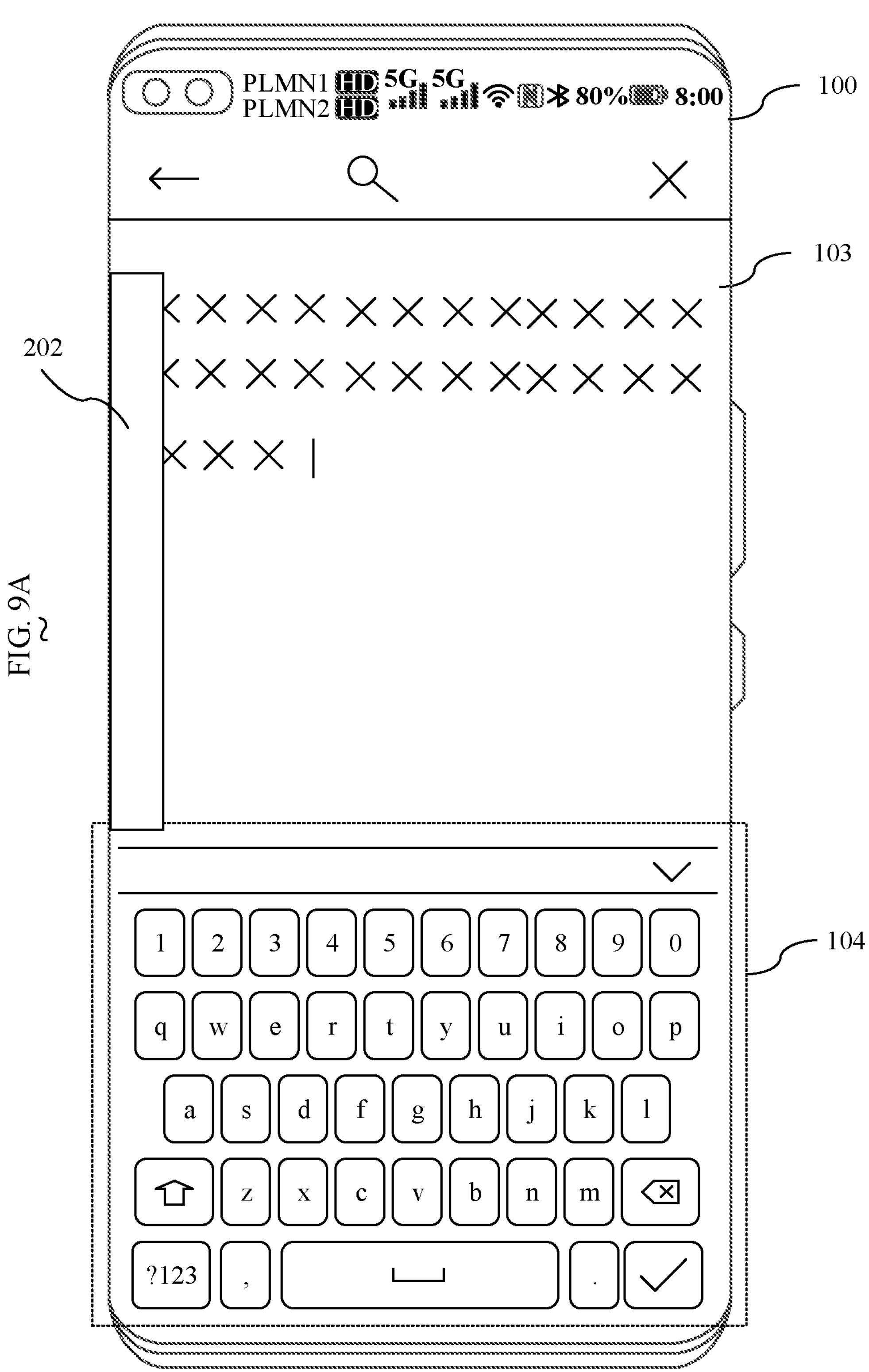
Figure 10A:
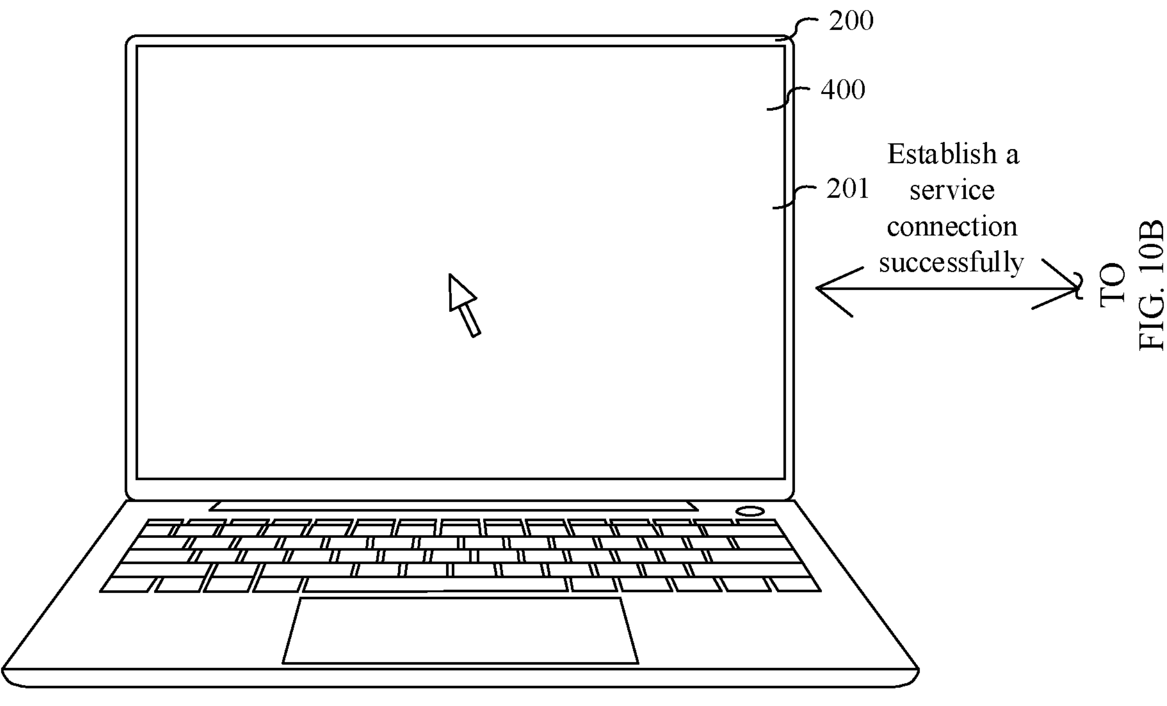
FIG. 10A-FIG. 11B are schematic diagrams in which a notebook computer displays a cursor of a mouse on a mobile phone in response to a user operation according to an embodiment of this application.
Figure 10B:
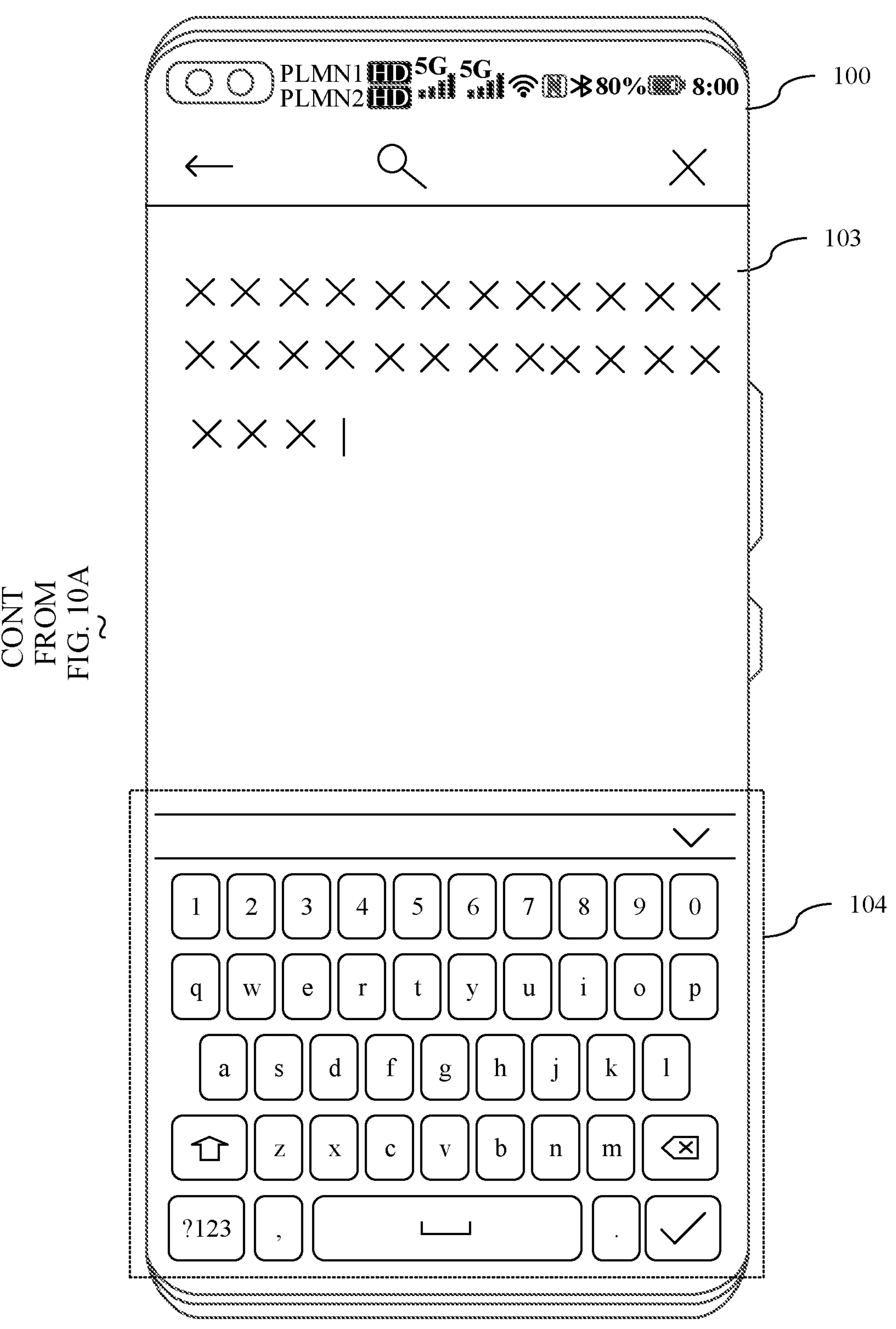

Type 2: As shown in FIG. 9A and FIG. 9B, after the notebook computer 200 starts to enter the preset mode, if the cursor of the mouse stays in the middle of the first interface 400 of the notebook computer 200 (before the notebook computer 200 enters the preset mode, the cursor of the mouse may be moved out of the edge on the right side of the first interface 400 in response to a move operation performed by a user on the location of the cursor of the mouse), as shown in FIG. 10A and FIG. 10B, after the notebook computer 200 successfully enters the preset mode, the notebook computer 200 cancels display of the first brightness bar 201 and controls the mobile phone 100 to cancel display of the second brightness bar 202. In addition, the location of the cursor of the mouse remains unchanged in the first interface 400. In this way, after receiving an operation, an input device such as a keyboard or the mouse of the notebook computer 200 can still input an instruction or data to the notebook computer 200.

Figure 11A:
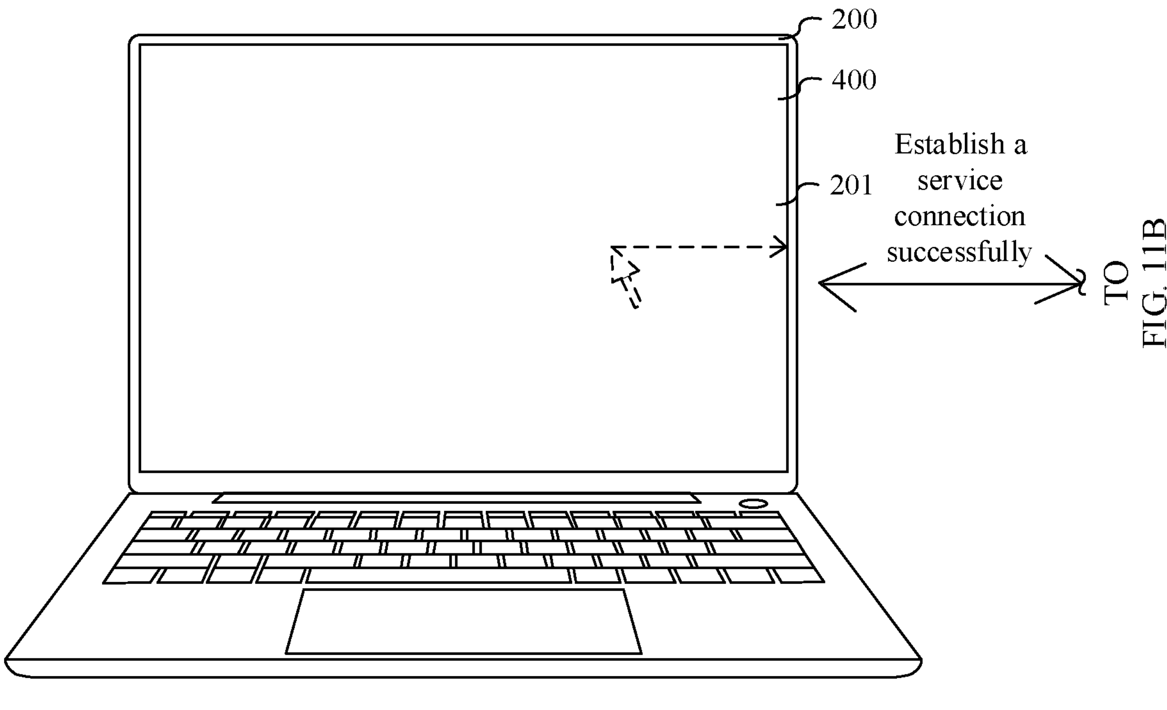
Figure 11B:
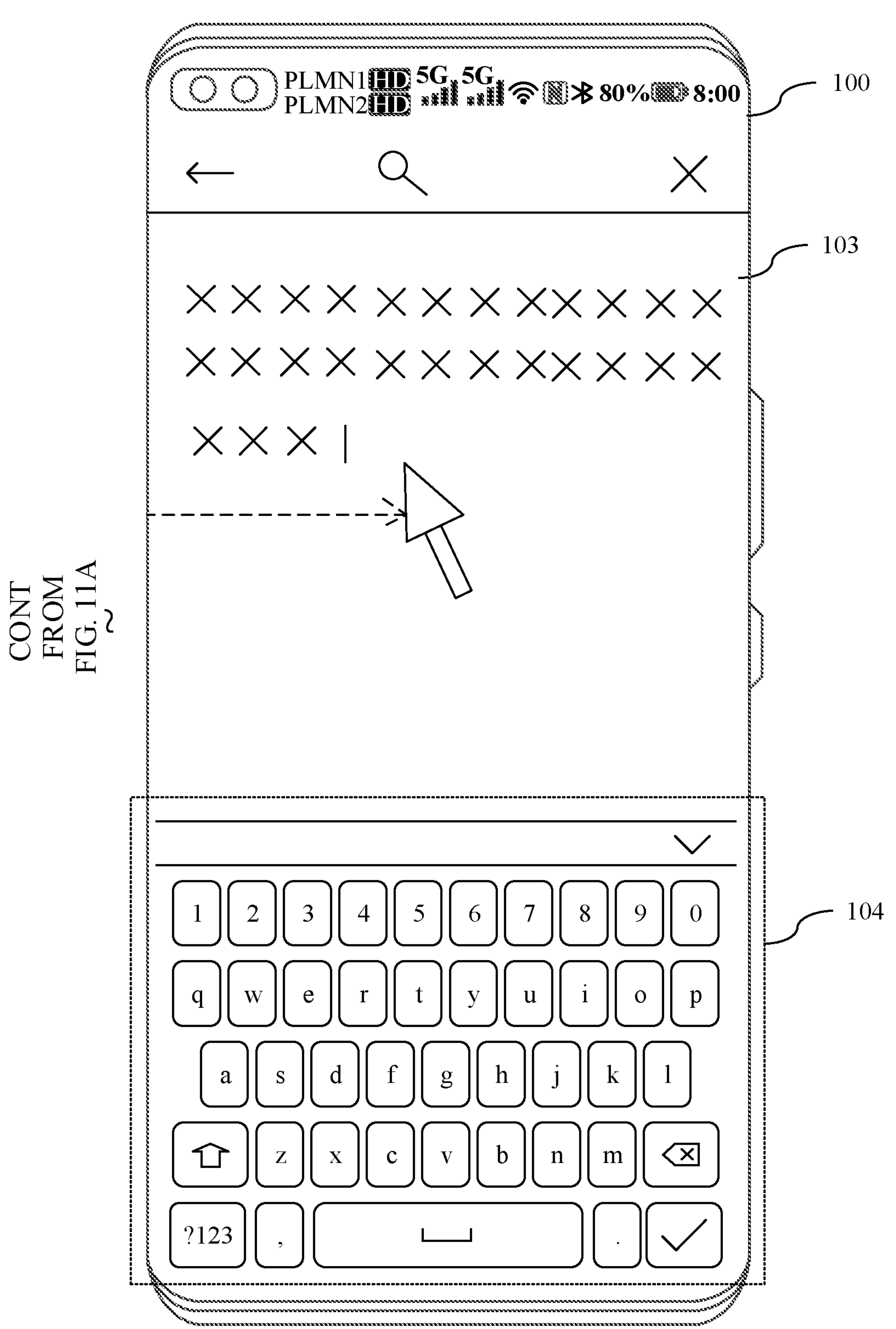

Based on the embodiment corresponding to FIG. 10A and FIG. 10B, when a user wants to send an instruction or data to the mobile phone 100 by using an input device such as the keyboard or the mouse of the notebook computer 200, as shown in FIG. 11A and FIG. 11B, the notebook computer 200 may move the cursor of the mouse to the edge on the right side of the first interface 400 of the notebook computer 200 in response to an operation of moving the cursor of the mouse to the right. Further, the notebook computer 200 moves, in response to an operation of moving the cursor of the mouse at the edge to the right side by a user, the cursor of the mouse to the word editing interface 103 of the mobile phone 100 for display. Similarly, the cursor of the mouse may be an arrow in the first interface 400 of the notebook computer 200. When the cursor of the mouse is displayed in the word editing interface 103 of the mobile phone 100, the cursor may switch from the arrow to a dot.

Based on the embodiment corresponding to FIG. 8A and FIG. 8B or FIG. 11A and FIG. 11B, when an input device such as the mouse, a touchpad, or the keyboard of the notebook computer 200 receives an input operation, the notebook computer 200 may send a control instruction to the mobile phone 100 in response to an operation of a user. The mobile phone 100 performs, in response to the control instruction from the notebook computer 200, a function corresponding to the control instruction.

Further, when the user inputs a text editing operation on the keyboard of the notebook computer 200, the mobile phone 100 displays, in the word editing interface 103, data corresponding to the text editing operation. When the user inputs an operation of moving the mouse on the touchpad or the mouse of the notebook computer 200, the notebook computer 200 responds to the operation of the user, and the mobile phone 100 controls, in the word editing interface 103, the cursor to move following the operation of moving the mouse. Alternatively, when the user operates a left button or a right button of the mouse on the touchpad or the mouse of the notebook computer 200, the mobile phone 100 performs, in the word editing interface 103 in response to the operation of the user, a function corresponding to the operation of clicking the left button or the right button of the mouse.

It should be noted that, when the mobile phone 100 performs the corresponding function in the word editing interface 103 in response to the operation of the user, content in an interface displayed on the notebook computer 200 has no association with content in the word editing interface 103, that is, the notebook computer 200 does not respond to the operation of the user.

In the foregoing embodiment, an example in which the mobile phone 100 is located on the right side of the notebook computer 200 is used to describe how the notebook computer 200 establishes the short-range communication connection to the mobile phone 100. In addition, when the mobile phone 100 is located on the left side or a front side of the notebook computer 200, a principle used by the notebook computer 200 to establish the short-range communication connection to the mobile phone 100 is similar to the principle used when the mobile phone 100 is located on the right side of the notebook computer 200, and details are not described herein again.

In conclusion, according to the device connection establishment method provided in the foregoing embodiment, the notebook computer 200 may move the cursor of the mouse to the edge on the right side of the first interface 400 of the notebook computer 200 in response to a move operation. Further, the notebook computer 200 may discover the mobile phone 100 in response again to a move operation of moving the cursor of the mouse to the right by a user, and start to establish the short-range communication connection to the discovered mobile phone 100. The notebook computer 200 displays the first prompt information in the first interface. After first duration that is after the mobile phone 100 starts to display the first prompt information, the notebook computer 200 starts to display the second prompt information in the second interface. In this way, a connection relationship between the notebook computer 200 and another device and a connected process node can be intuitively displayed to the user by using the first prompt information and the second prompt information. In addition, a connection process can be implemented by simply performing a move operation on an identifier of a discovered device. Compared with a related technology in which two devices need to be separately set, an operation is more convenient and faster, and experience is good.

The notebook computer 200 establishes the short-range communication connection to the mobile phone 100, to enter the preset mode. It may be learned that, the user only needs to move the cursor of the mouse to the edge of the first interface 400 and continue to perform an operation of moving the cursor out of the edge, so that the mobile phone 100 can have a function of sharing an input device with the tablet computer 300. The operation steps are convenient and simple, and efficiency is high.

In addition, when the notebook computer 200 has a function of identifying the direction of the mobile phone 100 relative to the notebook computer 200, if the notebook computer 200 moves, in response to a move operation performed on the cursor of the mouse toward a direction opposite to the mobile phone 100, the cursor of the mouse to an edge (not shown in the accompanying drawings) of a side (that is, a second side) that is of the first interface 400 of the notebook computer 200 and that is away from the mobile phone 100, and if the notebook computer 200 finds, in response to the move operation performed by the user on the cursor of the mouse toward the direction opposite to the mobile phone 100, that there is no device on the side that is of the notebook computer 200 and that is far away from the mobile phone 100, the notebook computer 200 does not establish the short-range communication connection to the mobile phone 100, and therefore the notebook computer 200 does not enter the preset mode (that is, the notebook computer 200 does not establish the service connection to the mobile phone 100).

In addition, when the notebook computer 200 has no function of identifying the direction of the mobile phone 100 relative to the notebook computer 200, if after the notebook computer 200 moves the cursor of the mouse to an edge on any side of the notebook computer 200 in response to a move operation on the cursor of the mouse, the notebook computer 200 can also perform device discovery in response to a move operation performed on the cursor of the mouse at the edge by the user in a direction toward the outside of a display of the notebook computer 200, and the notebook computer 200 further establishes the short-range communication connection to the mobile phone 100, the notebook computer 200 can also enter the preset mode.

It should be noted that, the foregoing embodiment is described by using an example in which the notebook computer 200 establishes, in response to the operating of moving, by the user to the right, the mouse located in the middle of the first interface 400, the short-range communication connection to the mobile phone 100 located on the right side of the notebook computer 200 and enters the preset mode.

Similar to that the mobile phone 100 is located on the right side of the notebook computer 200, when the mobile phone 100 is located on the left side or the front side of the notebook computer 200, the notebook computer 200 may enter the preset mode by using a similar principle, and details are not described herein again.

In some other embodiments, when the notebook computer 200 has no function of identifying the direction of the mobile phone 100 relative to the notebook computer 200, the notebook computer 200 may further establish, in response to a move operation performed on the cursor of the mouse located in the middle of the first interface 400 toward any direction other than a direction along the edge of the first interface 400, the short-range communication connection to the mobile phone 100 located on the right side of the notebook computer 200 and enter the preset mode.

The foregoing embodiment is described by using an example in which the notebook computer 200 performs device discovery in response to the operation of moving, to the right, the cursor of the mouse at the edge on the right side of the notebook computer 200. In some other embodiments, the notebook computer 200 can perform device discovery immediately after being powered on. The notebook computer 200 establishes the short-range communication connection to the discovered mobile phone 100 when responding to the operation of moving, to the right, the cursor of the mouse at the edge on the right side of the notebook computer 200.

It should be noted that, that the notebook computer 200 discovers one device is used as an example in the foregoing embodiment to describe how the notebook computer 200 enters the preset mode. An example in which the notebook computer 200 discovers a plurality of devices is used below to describe how the notebook computer 200 enters the preset mode. The plurality of devices may be located in a same direction or different directions of the notebook computer 200. This is not limited in this application.

Figure 12:
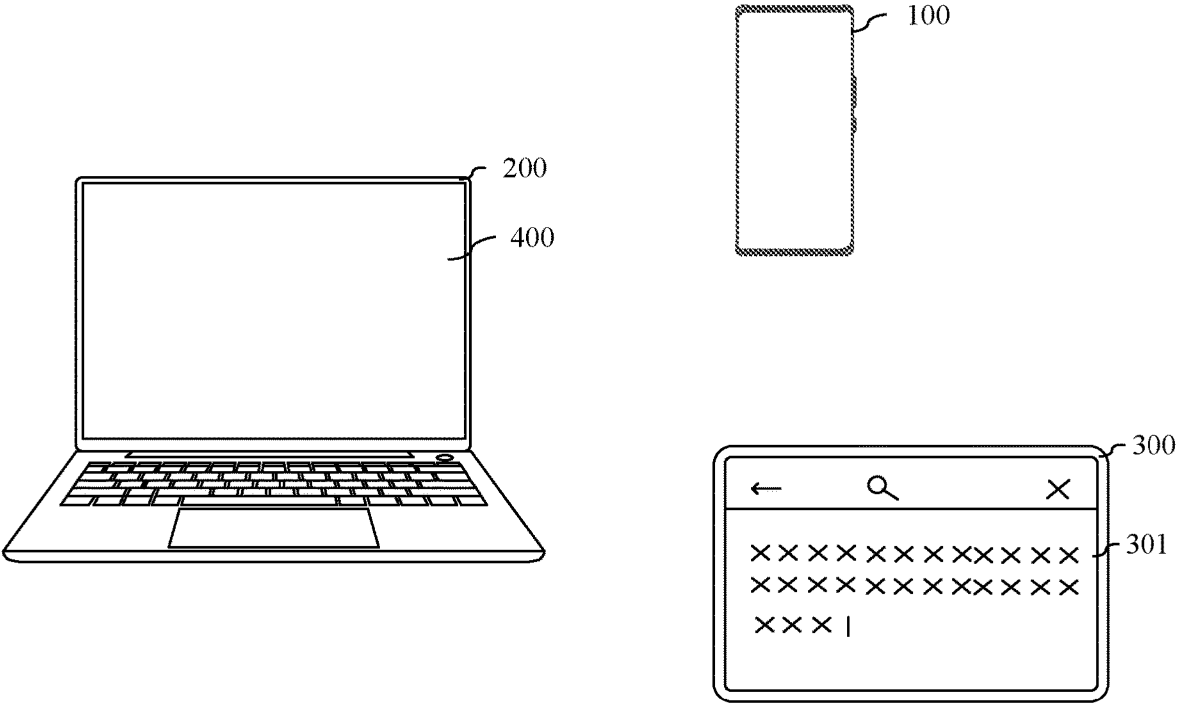
FIG. 12 is a schematic diagram of a location relationship between a notebook computer and each of a mobile phone and a tablet computer according to an embodiment of this application.

As shown in FIG. 12, the right side of the notebook computer 200 includes the mobile phone 100 and the tablet computer 300. The tablet computer 300 displays a word editing interface 301. The word editing interface 301 (that is, a second interface) displayed on the tablet computer 300 may also be referred to as a text input interface.

Figure 13:
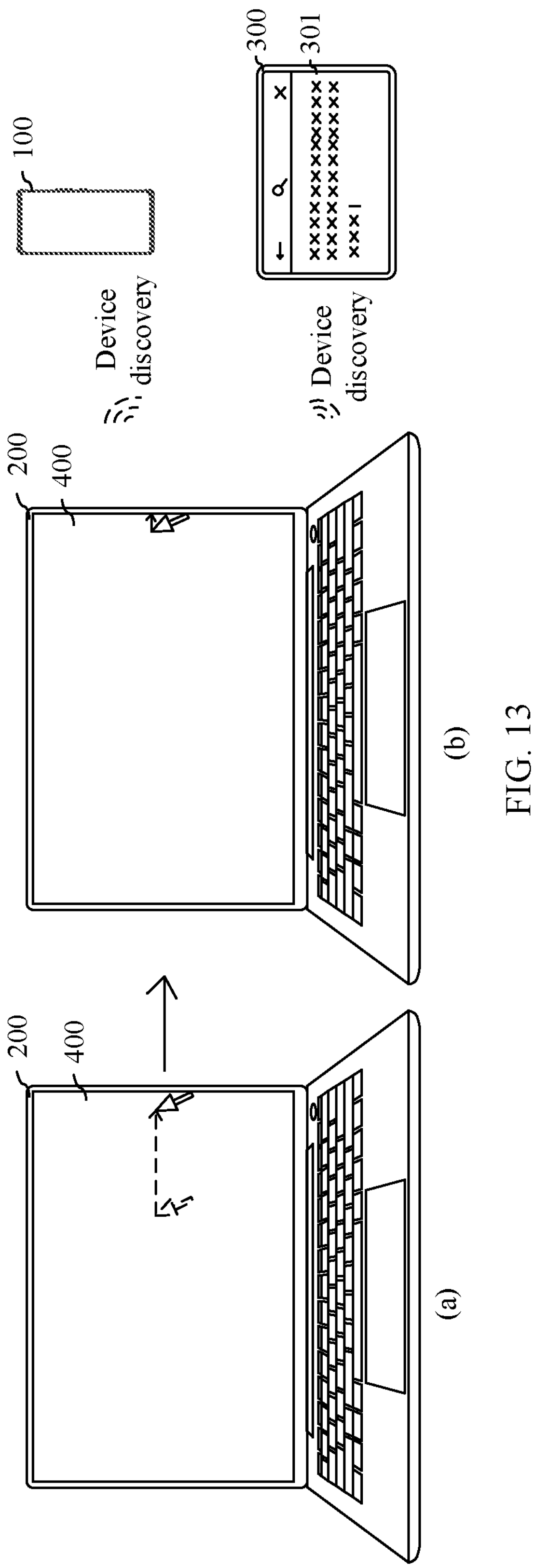
FIG. 13 is a second schematic diagram of an interface in which a notebook computer performs device discovery according to an embodiment of this application.

As shown in (a) in FIG. 13, the device connection establishment method provided in the embodiments of this application includes: The notebook computer 200 may move a cursor of a mouse to an edge on a right side of the notebook computer 200 in response to an operation of moving the cursor of the mouse to the right. Further, as shown in (b) in FIG. 13, the notebook computer 200 continues to perform device discovery in response to an operation (that is, an operation of moving the cursor of the mouse outward along the edge on the right side of the first interface 400) of moving, by a user to the right, the cursor of the mouse at the edge on the right side of the notebook computer 200. As shown in (b) in FIG. 13, the notebook computer 200 discovers the mobile phone 100 and the tablet computer 300.

Figure 5B:
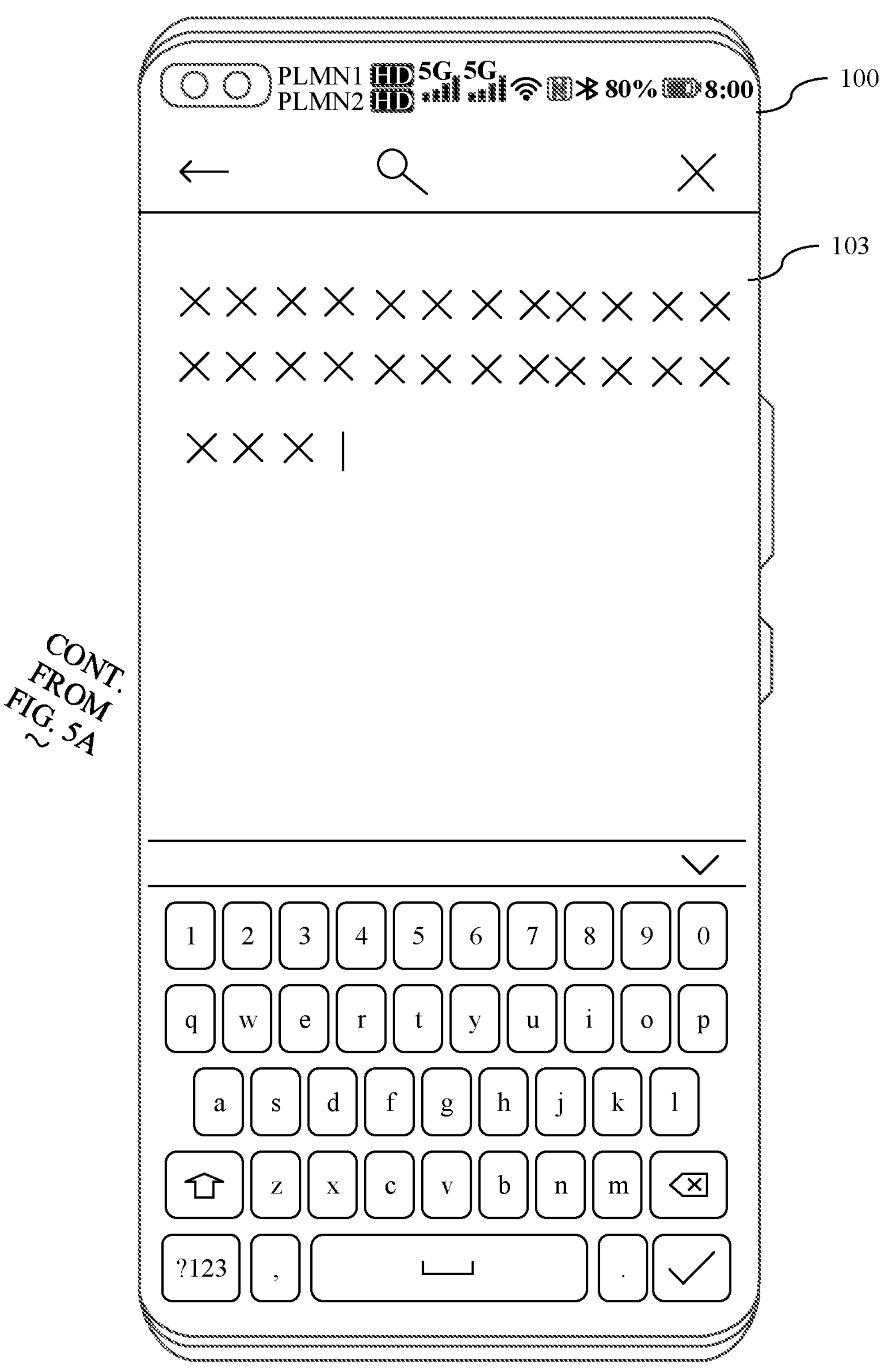
Figure 14:
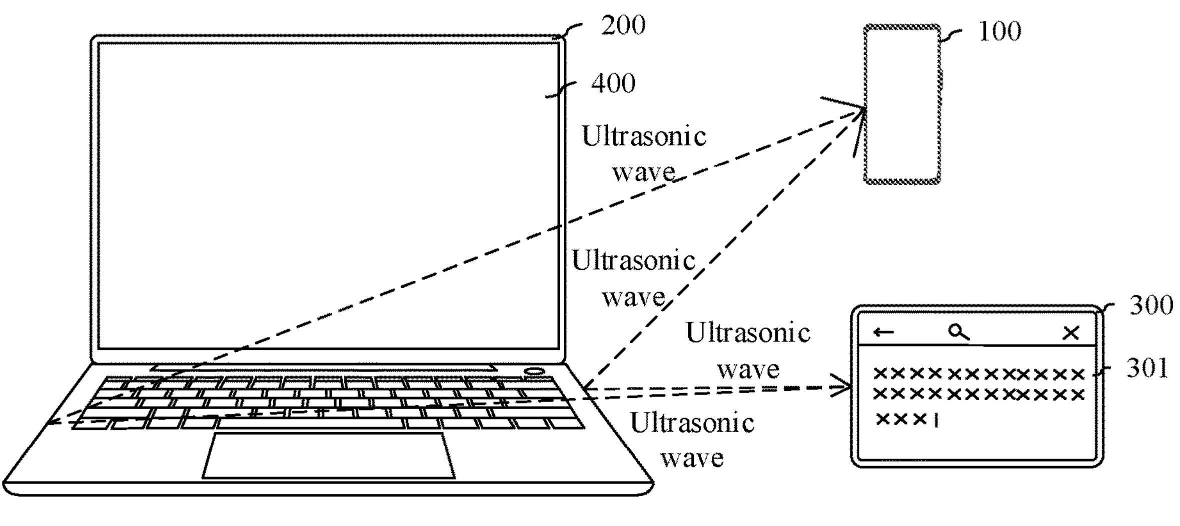
FIG. 14 is a diagram of a principle used by a notebook computer to identify directions of a mobile phone and a tablet computer according to an embodiment of this application.

Further, as shown in FIG. 14, the notebook computer 200 identifies directions of the mobile phone 100 and the tablet computer 300 relative to the notebook computer 200. A principle used by the notebook computer 200 to identify the directions of the mobile phone 100 and the tablet computer 300 relative to the notebook computer 200 is the same as that used in the embodiment corresponding to FIG. 5A and FIG. 5B, and details are not described herein again.

Figure 15A:
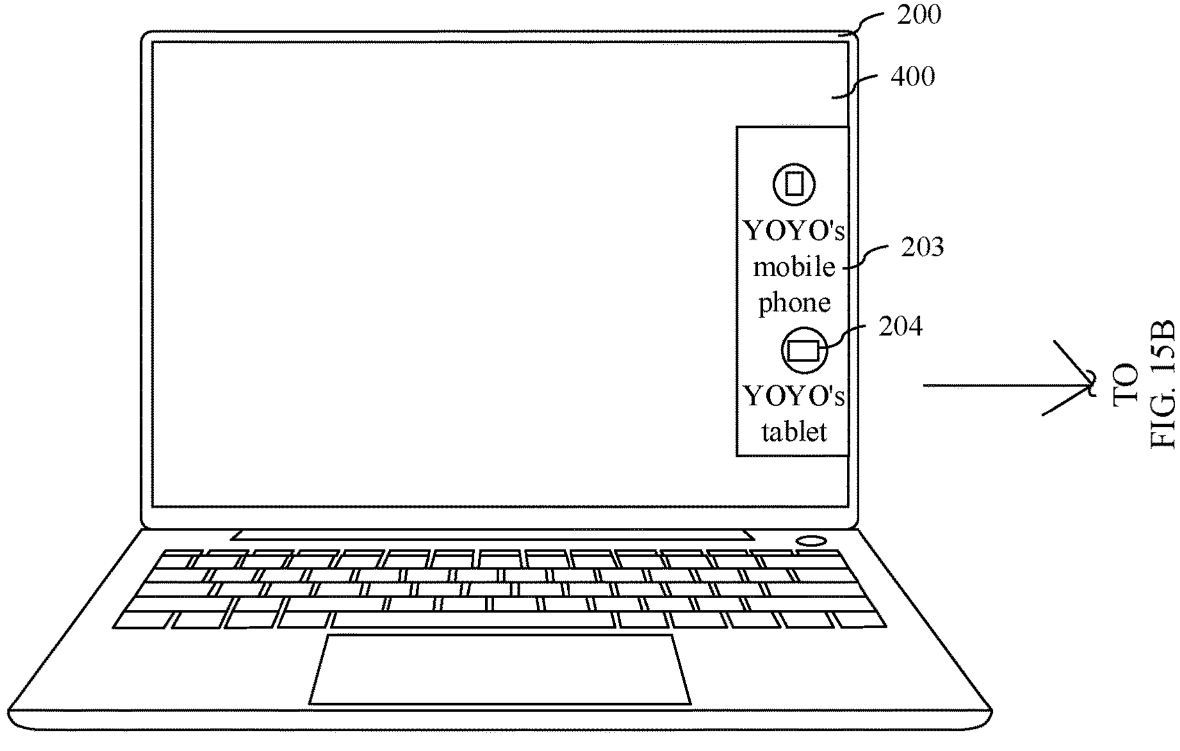
FIG. 15A and FIG. 15B are schematic diagrams of interfaces in which a notebook computer starts, in response to a tap operation on an icon of a tablet computer in a device icon list, to establish a short-range communication connection to the tablet computer according to an embodiment of this application.

When the notebook computer 200 identifies that both the mobile phone 100 and the tablet computer 300 are located on the right side of the notebook computer 200, as shown in FIG. 15A, the notebook computer 200 displays a list 203 of icons of discovered devices at the edge on the right side of the first interface 400. The device icon list 203 includes an icon of the mobile phone 100, a name "YOYO's mobile phone" of the mobile phone 100, an icon of the tablet computer 300, and a name "YOYO's tablet" of the tablet computer 300. In this way, the notebook computer 200 can display the directions of the discovered devices relative to the notebook computer 200 and identity information.

Figure 15B:
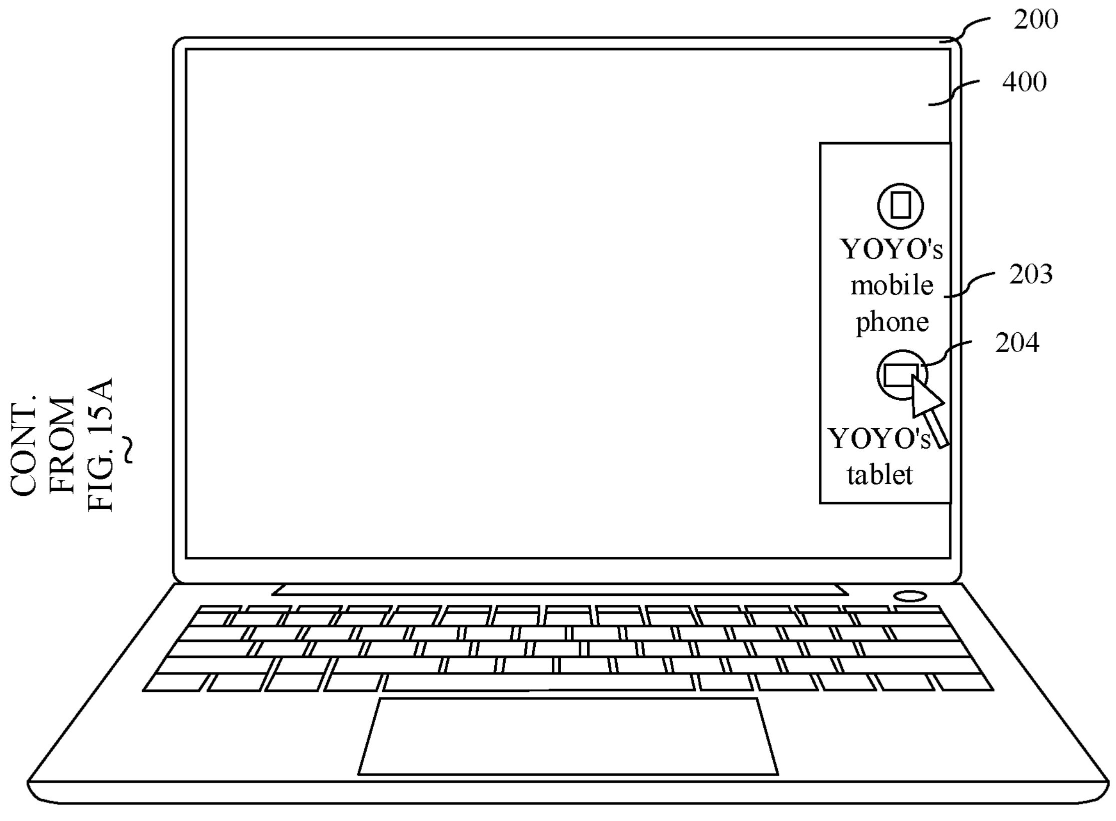

As shown in FIG. 15B, the notebook computer 200 may start, in response to a tap operation on the icon 204 of the tablet computer 300, to establish a short-range communication connection to the tablet computer 300. In other words, the notebook computer 200 may establish, in response to a tap operation on a device icon in the device icon list 203, the short-range communication connection to a device corresponding to the tapped icon. In this way, a requirement that a user controls the notebook computer 200 to connect to a selected device can be met. It should be noted that, a principle used by the notebook computer 200 to establish the short-range communication connection to the tablet computer 300 is the same as the principle used in the embodiment corresponding to FIG. 6A and FIG. 6B, and details are not described herein again.

Figure 6B:
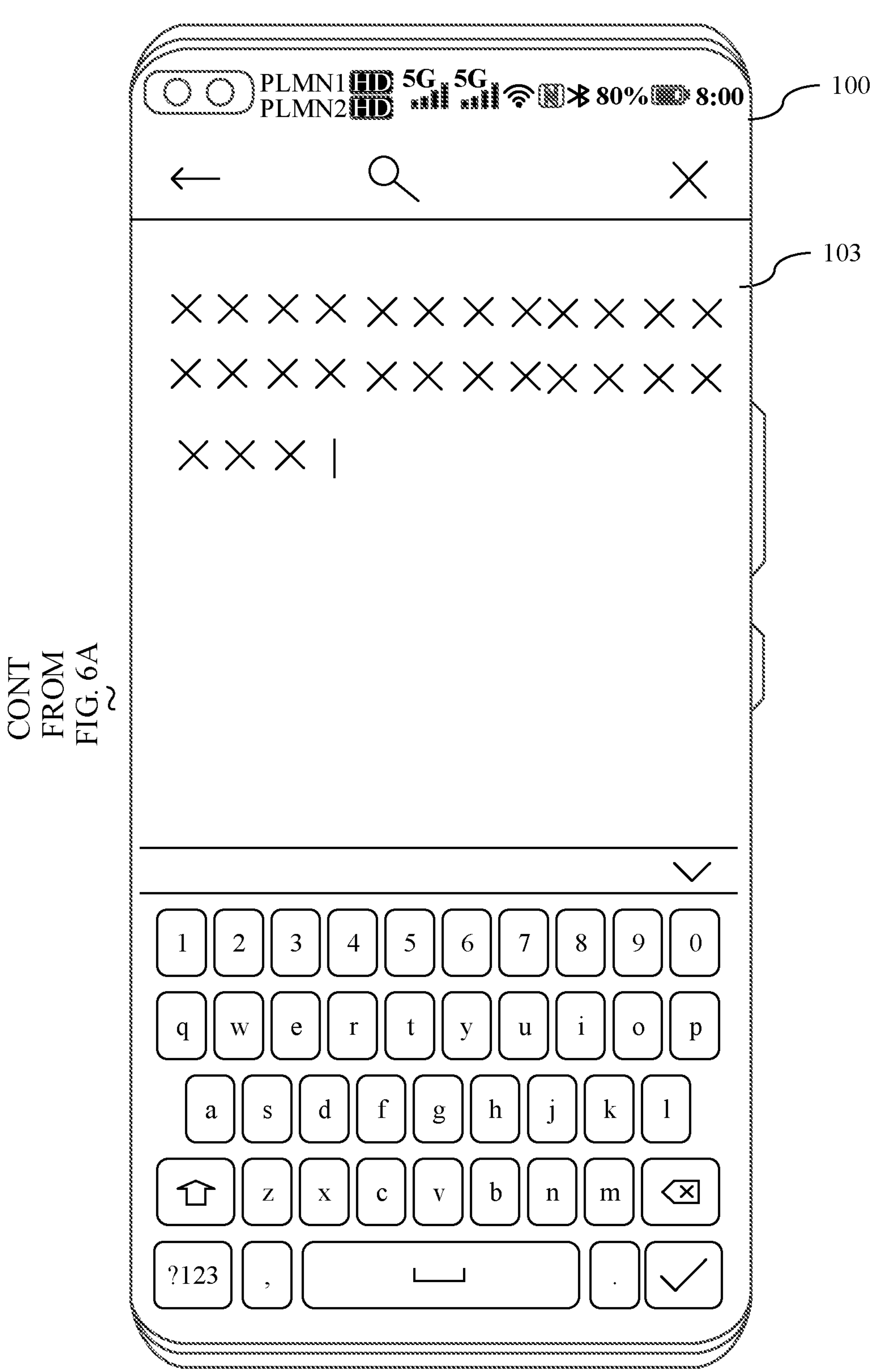
Figure 16:
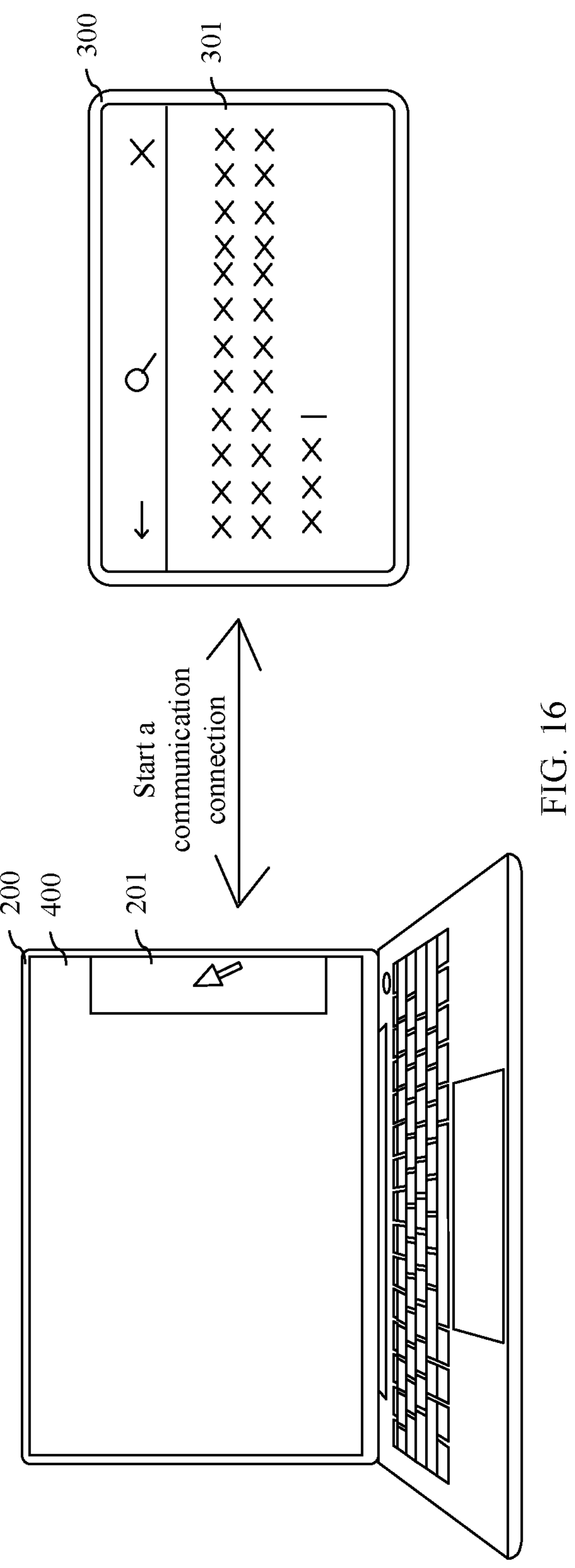
FIG. 16 is a second schematic diagram of an interface in which a notebook computer establishes a short-range communication connection to a mobile phone according to an embodiment of this application.

Similar to the embodiment corresponding to FIG. 6A and FIG. 6B, after the notebook computer 200 starts to establish the short-range communication connection to the tablet computer 300, as shown in FIG. 16, the notebook computer 200 displays the first brightness bar 201 at the edge on the right side of the first interface 400. The first brightness bar 201 may be understood as first prompt information used to indicate that the notebook computer 200 is establishing the short-range communication connection to the device on the right side. In addition, the first prompt information may alternatively be an icon and identity information of the tablet computer 300, text information "start to establish a connection to the tablet computer on the right side", or the like. This is not limited herein. Moreover, the first brightness bar 201 may alternatively be at another location in the first interface 201 of the notebook computer 200. This is not limited herein.

Similarly, after the notebook computer 200 successfully establishes the short-range communication connection to the tablet computer 300, the notebook computer 200 starts to establish a "service connection" to the tablet computer 300. After completing the "service connection", the notebook computer 200 enters a preset mode. The preset mode may also be referred to as an input device sharing mode, a keyboard and mouse sharing mode, or the like. This is not limited herein. In the preset mode, the notebook computer 200 has a function of sharing an input device with the tablet computer 300, and therefore a process in which the notebook computer 200 enters the preset mode may be understood as a process in which the notebook computer 200 establishes the "service connection" to the tablet computer 300.

Figure 17:
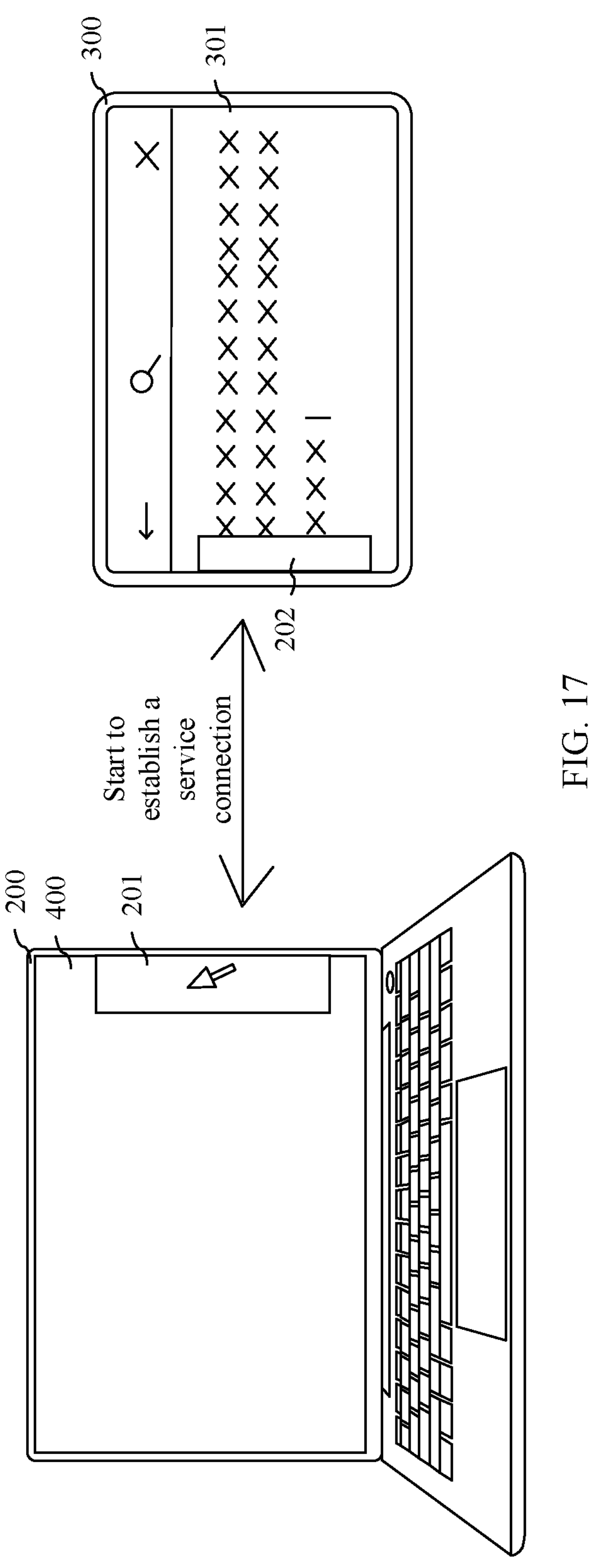
FIG. 17 is a third schematic diagram of an interface displayed after a notebook computer starts to enter a preset mode according to an embodiment of this application.

A specific process in which the notebook computer 200 establishes the "service connection" to the tablet computer 300 may be as follows: The notebook computer 200 sends first information to the tablet computer 300, where the first information is used to indicate that the notebook computer 200 starts to enter the preset mode (that is, the notebook computer 200 starts to establish the service connection to the tablet computer 300). As shown in FIG. 17, after receiving the first information, the tablet computer 300 displays a second brightness bar 202 at an edge on a left side of the mobile phone 100. The second brightness bar 202 may be understood as second prompt information used to indicate the notebook computer 200 to establish the "service connection" to the tablet computer 300. In addition, the second prompt information may alternatively be text information "start to enter the keyboard and mouse sharing mode" displayed on the notebook computer 200 or the mobile phone 100. This is not limited herein. Moreover, the second brightness bar 202 may alternatively be at another location in the word editing interface 301 of the tablet computer 300. This is not limited herein.

Figure 18:
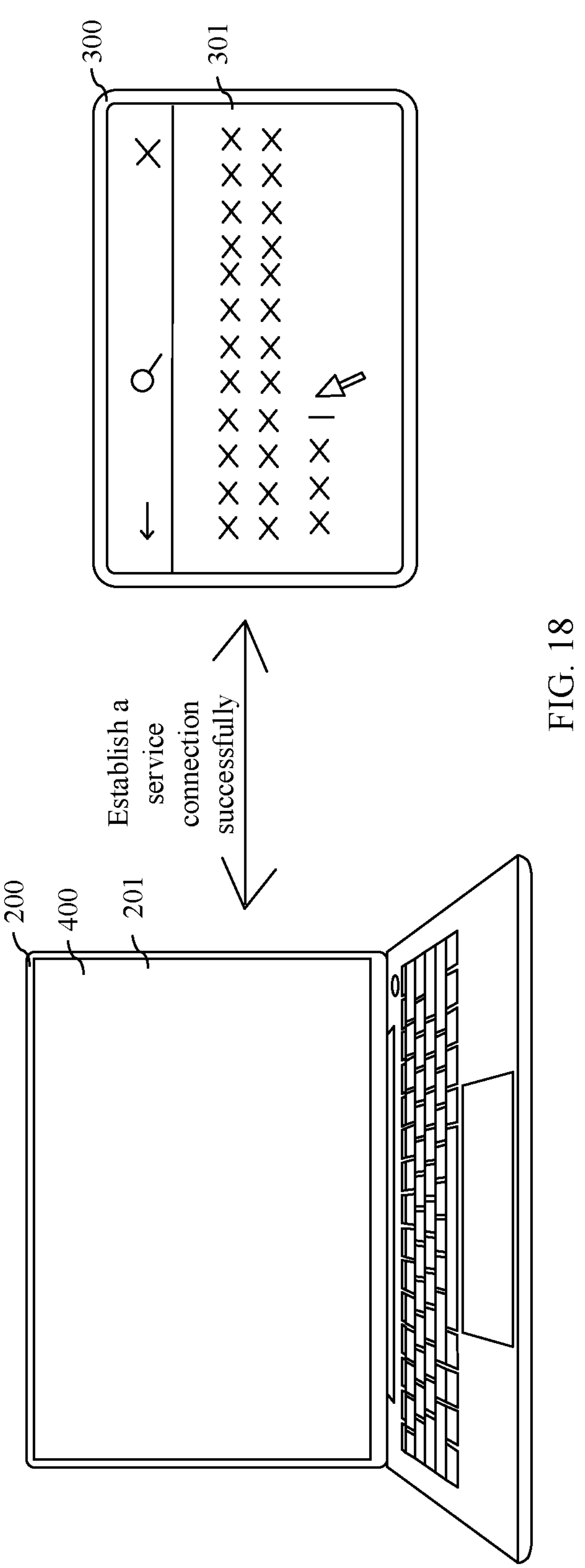
FIG. 18 is a schematic diagram of an interface in which a cursor of a mouse is automatically displayed on a tablet computer according to an embodiment of this application.

After the notebook computer 200 successfully enters the preset mode (that is, the notebook computer 200 establishes the service connection to the tablet computer 300), as shown in FIG. 18, the notebook computer 200 cancels display of the first brightness bar 201 and controls the tablet computer 300 to cancel display of the second brightness bar 202. After the first brightness bar 201 and the second brightness bar 202 disappear, a user can be prompted that the notebook computer 200 successfully enters the preset mode.

Still as shown in FIG. 18, the word editing interface 301 of the tablet computer 300 may display the cursor of the mouse. A principle used when the word editing interface 301 of the tablet computer 300 can display the cursor of the mouse is the same as the principle used when the word editing interface 103 of the mobile phone 100 displays the cursor of the mouse, and details are not described herein again.

In this way, when an input device such as the mouse, a touchpad, or a keyboard of the notebook computer 200 receives an input operation, the notebook computer 200 may send a control instruction to the tablet computer 300 in response to an operation of a user. The tablet computer 300 performs, in response to the control instruction from the notebook computer 200, a function corresponding to the control instruction.

Further, when the user inputs a text editing operation on the keyboard of the notebook computer 200, the tablet computer 300 displays, in the word editing interface 301, data corresponding to the text editing operation. When the user inputs an operation of moving the mouse on the touchpad or the mouse of the notebook computer 200, the notebook computer 200 responds to the operation of the user, and the tablet computer 300 controls, in the word editing interface 301, the cursor to move following the operation of moving the mouse. Alternatively, when the user operates a left button or a right button of the mouse on the touchpad or the mouse of the notebook computer 200, the tablet computer 300 performs, in the word editing interface 301 in response to the operation of the user, a function corresponding to the operation of clicking the left button or the right button of the mouse.

It should be noted that, when the tablet computer 300 performs the corresponding function in the word editing interface 301 in response to the operation of the user, content in an interface displayed on the notebook computer 200 has no association with content in the word editing interface 301, that is, the notebook computer 200 does not respond to the operation of the user.

It should be noted that, in all the embodiments corresponding to FIG. 12 to FIG. 18, an example in which the mobile phone 100 and the tablet computer 300 are located on the right side of the notebook computer 200 is used to describe how the notebook computer 200 establishes the short-range communication connection to the tablet computer 300. In addition, when the mobile phone 100 and the tablet computer 300 are located on a left side or a front side of the notebook computer 200, a principle used by the notebook computer 200 to establish the short-range communication connection to the tablet computer 300 is similar to the principle used when the mobile phone 100 and the tablet computer 300 are located on the right side of the notebook computer 200, and details are not described herein again.

According to the device connection establishment method provided in the embodiments corresponding to FIG. 12 to FIG. 18, the notebook computer 200 may move the cursor of the mouse to the edge on the right side of the first interface 400 of the notebook computer 200 in response to a move operation performed by a user on the cursor of the mouse. Further, the notebook computer 200 may continue to discover the mobile phone 100 and the tablet computer 300 in response to a move operation of moving the cursor of the mouse to the right by the user. Then, the notebook computer 200 displays the icon of the mobile phone 100 and the icon (that is, an identifier of a second terminal) of the tablet computer 300. The notebook computer 200 may establish the short-range communication connection to the tablet computer 300 in response to a tap operation performed by the user on the icon of the tablet computer 300, and therefore the notebook computer 200 enters the preset mode. It may be learned that, the user needs to perform only two operations, so that the notebook computer 200 can select, from a plurality of discovered devices, the tablet computer 300 for connection to enter the preset mode. In this way, the notebook computer 200 has a function of sharing an input device with the tablet computer 300. The operation steps are convenient and simple, and efficiency is high.

It should be noted that, in the embodiments corresponding to FIG. 12 to FIG. 18, an example in which the right side of the notebook computer 200 includes two devices is used to describe how to display an icon of a device discovered by the notebook computer 200. With reference to FIG. 19A to FIG. 20B, the following describes how to display an icon of a device discovered by the notebook computer 200 when a quantity of devices on the right side of the notebook computer 200 is greater than a specified threshold (the specified threshold may be 3, 4, 5, or the like).

For example, when the notebook computer 200 supports display of icons of three devices at one single time, if it is found that a total of five devices exist on the right side of the notebook computer 200: a device A, a device B, a device C, a device D, and a device E, the notebook computer 200 performs priority sorting on the discovered devices. A rule of the priority sorting may be that a device that is connected to the notebook computer 200 at an earlier moment last time has a higher priority, or that a device that has been previously connected to the notebook computer 200 more times has a higher priority. This is not limited herein.

It is assumed that the priority sorting determined by the notebook computer 200 is: a priority of the device B>a priority of the device A>a priority of the device C>a priority of the device D>a priority of the device E. In the device icon list 203 in the first interface 400, the notebook computer 200 displays icons of three devices with a highest priority, that is, an icon of the device A, an icon of the device B, and an icon of the device C.

Figure 19A:
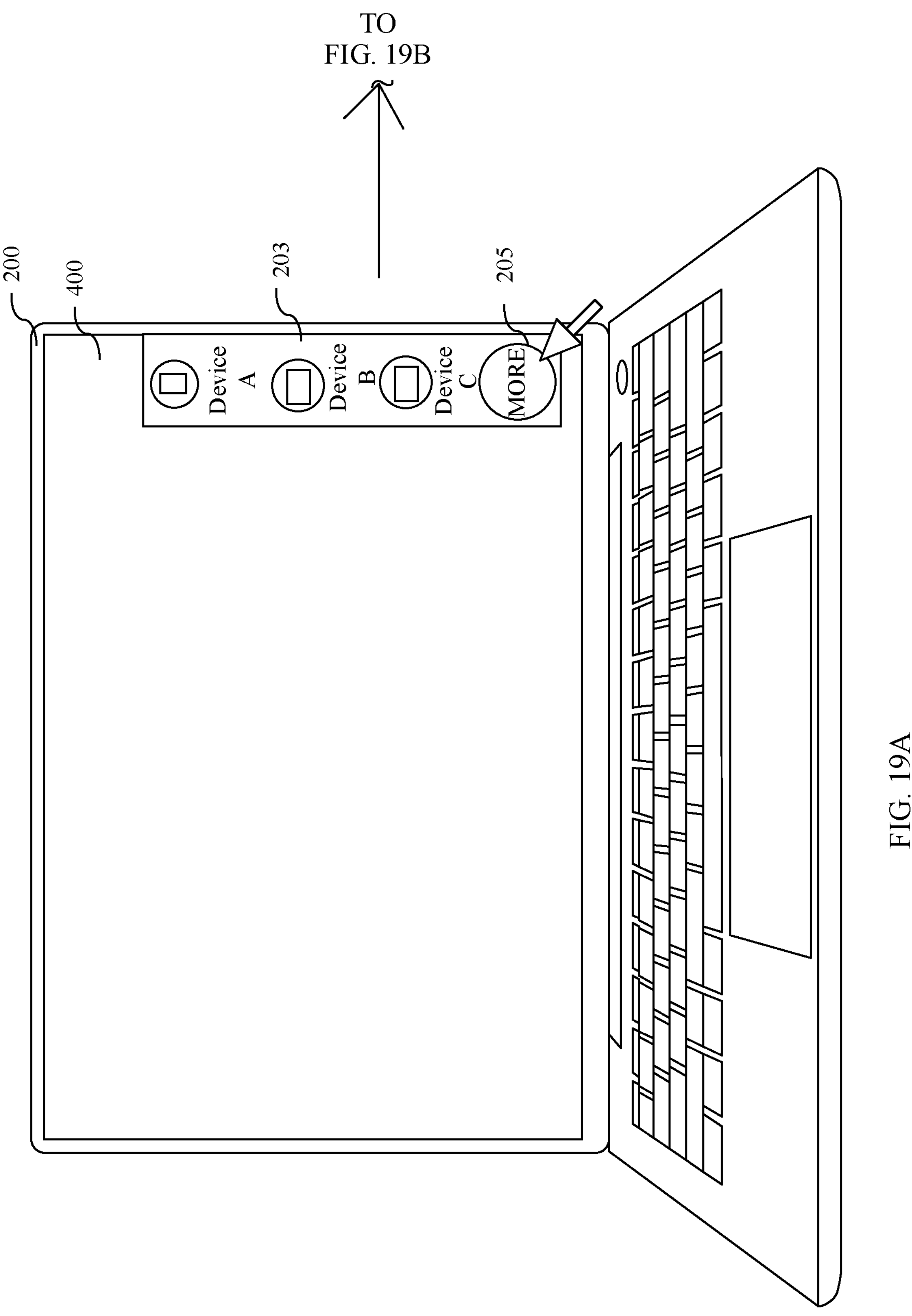
FIG. 19A and FIG. 19B are schematic diagrams of interfaces in which a notebook computer displays a third interface in response to a tap operation on a cursor in a first interface according to an embodiment of this application.

As shown in FIG. 19A, a sorting order of the icon of the device A, the icon of the device B, and the icon of the device C is as follows: The icon of the device A, the icon of the device B, and the icon of the device C are sorted from top to bottom. To be specific, the notebook computer 200 displays an icon of a device with a highest priority at a middle location of the device icon list 203, displays an icon of a device with a second highest priority above the icon of the device with the highest priority, and displays an icon of a device with a third highest priority below the icon with the highest priority. In other words, the notebook computer 200 may arrange an order of icons of devices in the device icon list 203 based on priorities of the devices, that is, a sorting location of a second terminal with a higher priority is closer to the middle. It may be understood that, a location closer to the middle of the first interface is a location more convenient for a user to operate, so that it can be more convenient for a user to operate when the sorting location of the second terminal with the higher priority is closer to the middle.

In some other implementations, when the cursor of the mouse is at the edge on the right side of the notebook computer 200, a location of the icon of the device B may be a location of the cursor of the mouse, to be specific, the location of the cursor is identified in real time, and an icon corresponding to a device with a highest priority is displayed near the cursor. Further, the notebook computer 200) arranges the icon of the device A and the icon of the device C in a manner similar to that in the embodiment corresponding to in FIG. 19A, that is, a sorting location of a second terminal with a higher priority is closer to the location of the cursor. In another aspect, a location closer to the cursor in the first interface is a location more convenient for a user to perform an operation, so that it can also be more convenient for a user to operate when the sorting location of the second terminal with the higher priority is closer to the location of the cursor.

It should be noted that, when the notebook computer 200 can further support display of icons of more (for example, four or five) devices at one single time, a rule of arranging an order of the icons of the devices is the same as the arrangement rule used when the notebook computer 200 supports display of icons of three devices at one single time, and details are not described herein again.

Figure 19B:
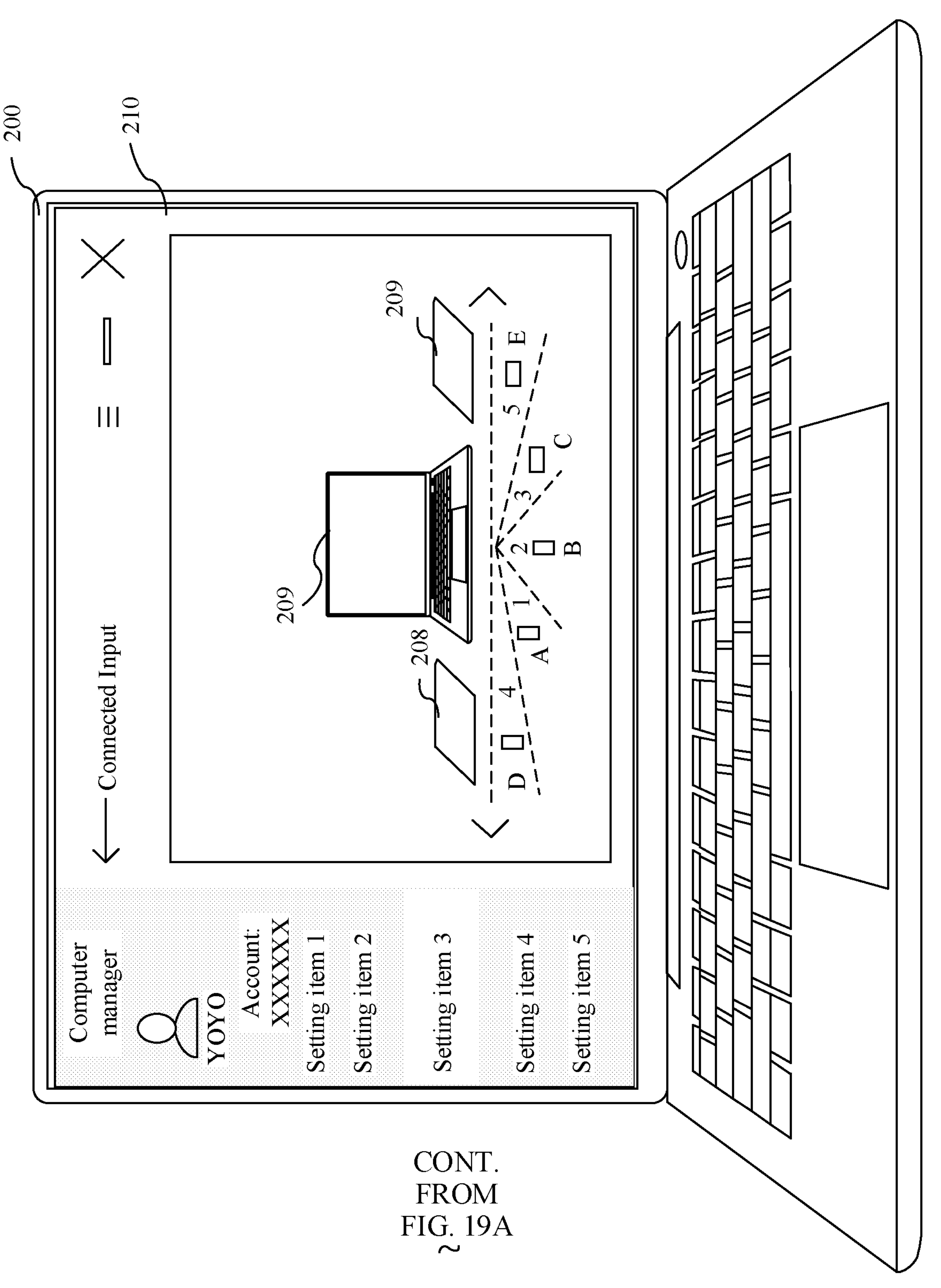

In addition, the notebook computer 200 may further display, in response to a user operation, an icon of an undisplayed device remaining in discovered devices. A manner in which the notebook computer 200 can display, in response to a user operation, an icon of an undisplayed device remaining in discovered devices includes but is not limited to the following two cases:

Case 1: Still as shown in FIG. 19A, the first interface 400 of the notebook computer 200 further includes a first control 205. The first control 205 is marked with text information "MORE", and the first control 205 is used to indicate to display an icon of an undisplayed device that has been discovered. As shown in FIG. 19A-FIG. 19B, the notebook computer 200 may display a third interface 210 in response to a tap operation on the first control 205.

The third interface 210 includes an option list, and the option list includes a setting item 1, a setting item 2, a setting item 3, a setting item 4, and a setting item 5. A specific name of the "setting item 3" may be, for example, a name such as "hardware sharing", "super control", or "device connection". This is not limited herein.

The third interface 210 further includes an icon 209 of the notebook computer 200, a first area 207 located on a left side of the icon 209 of the notebook computer 200, and a second area 208 located on a right side of the icon 209 of the notebook computer 200. The third interface 210 may support display of icons of five devices at one single time.

In some embodiments, still as shown in FIG. 19A, an area below the icon 209 of the notebook computer 200 is divided into a sub-area 1, a sub-area 2, a sub-area 3, a sub-area 4, and a sub-area 5. Each sub-area is used to display an icon and identity information of a discovered device. An order of the sub-area 1, the sub-area 2, the sub-area 3, the sub-area 4, and the sub-area 5 from left to right is sequentially: the sub-area 4, the sub-area 1, the sub-area 2, the sub-area 3, and the sub-area 5.

When the priority sorting determined by the notebook computer 200 is: the priority of the device B>the priority of the device A>the priority of the device C>the priority of the device D>the priority of the device E, an icon of the device D is displayed in the sub-area 4, the icon of the device A is displayed in the sub-area 1, the icon of the device B is displayed in the sub-area 2, the icon of the device C is displayed in the sub-area 3, and an icon of the device E is displayed in the sub-area 5. To be specific, the notebook computer 200 displays an icon of a device with a highest priority at a middle location, displays an icon of a device with a second highest priority on a left side of the icon with the highest priority, displays an icon of a device with a third highest priority on a right side of the icon with the highest priority, and so on. It may be learned that, the notebook computer 200 may arrange an order of icons of devices based on priorities of the devices.

Figure 20A:
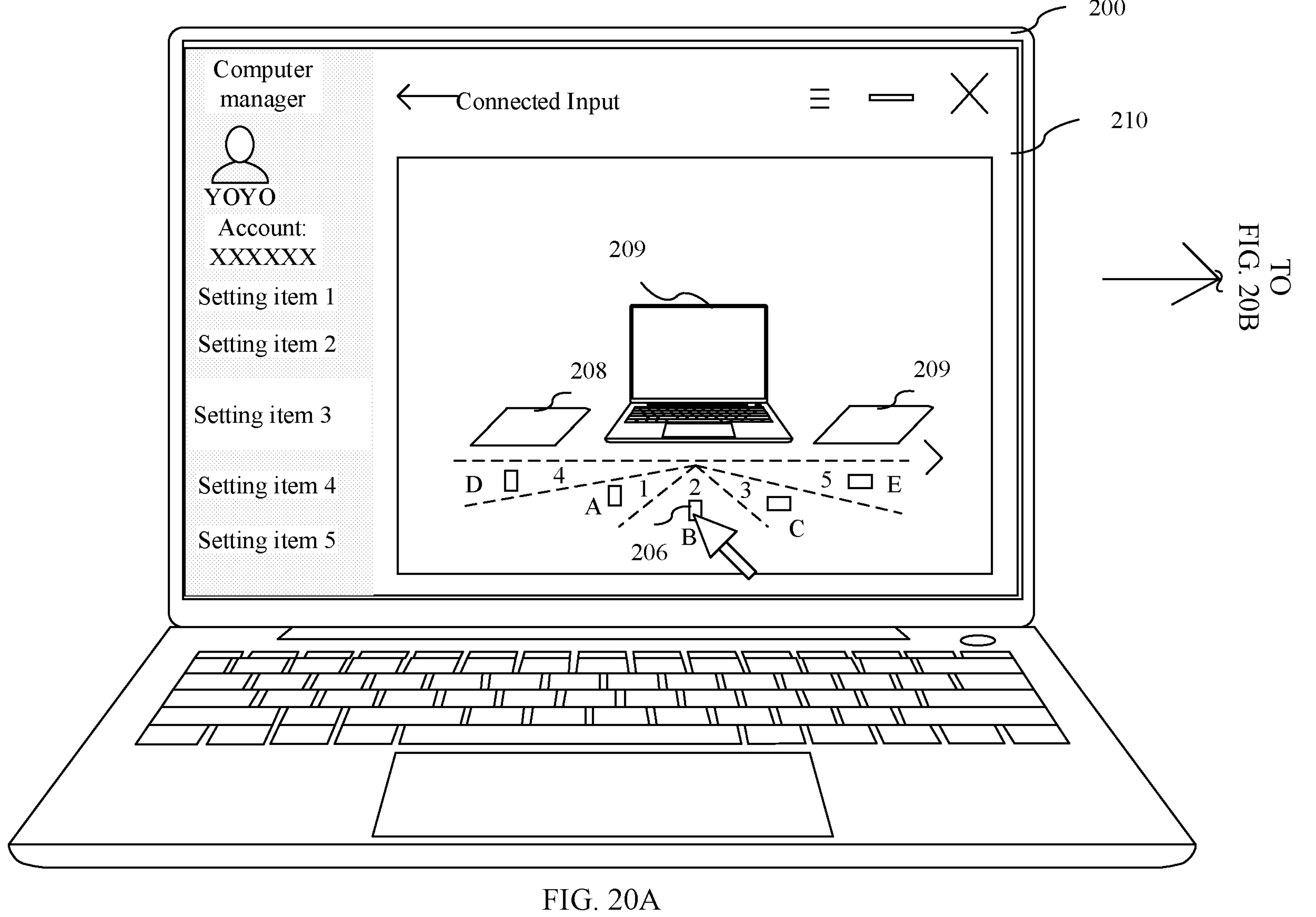
FIG. 20A and FIG. 20B are schematic diagrams of interfaces in which a notebook computer establishes a short-range communication connection to a device B in response to a tap operation on an icon of the device B in a third interface according to an embodiment of this application.
Figure 20B:
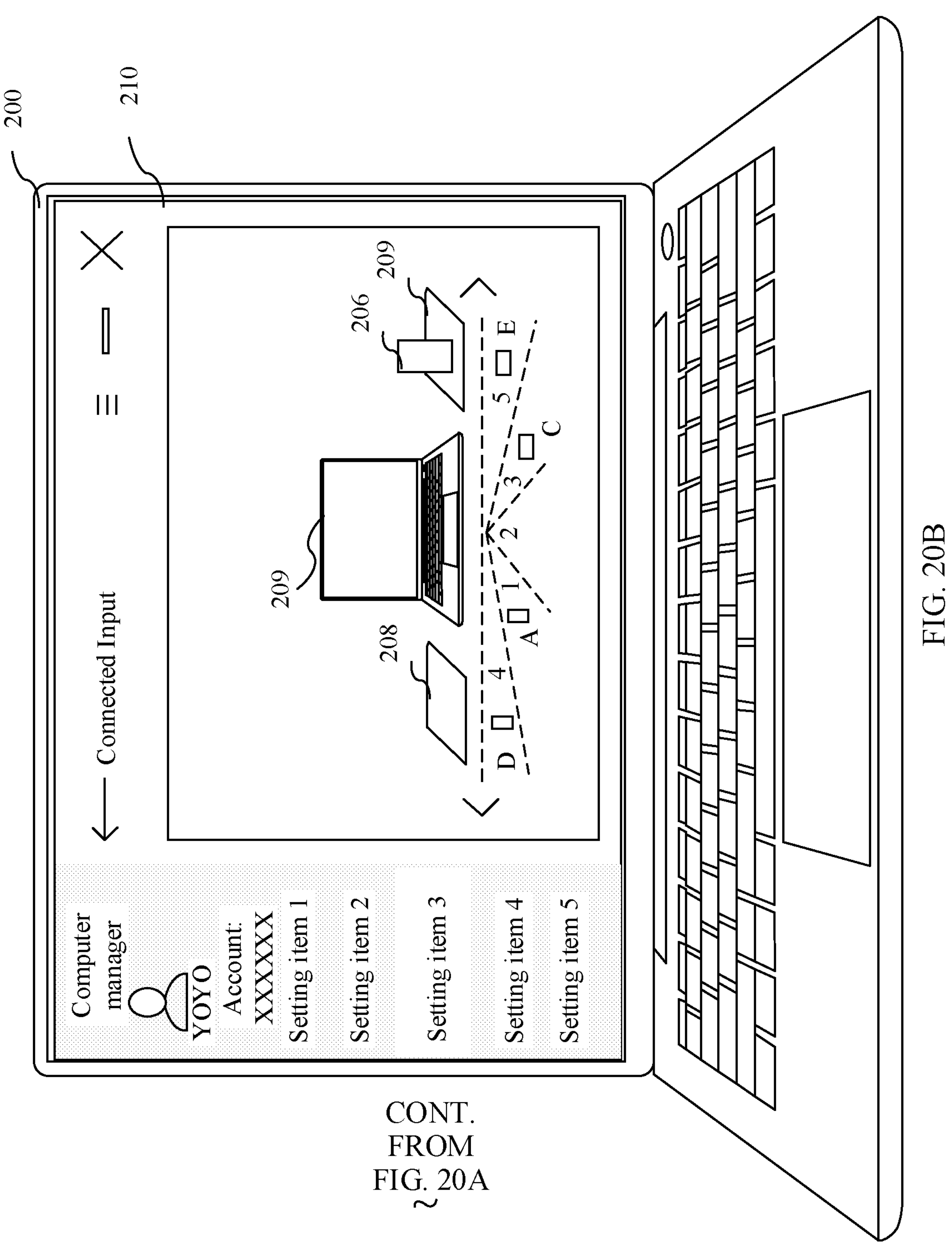

As shown in FIG. 20A-FIG. 20B, the notebook computer 200 may establish a short-range communication connection to the device B in response to a tap operation on an icon 206 of the device B in the third interface 210. After the notebook computer 200 establishes the short-range communication connection to the device B, the icon 206 of the device B disappears from the sub-area 2, and the notebook computer 200 may display the icon 206 of the device B in the second area 208 located on the right side of the icon 209 of the notebook computer 200. In other words, a direction of a connected device relative to the notebook computer 200 is the same as a direction that is of an area in which an icon of the connected device is located and that is relative to the icon 209 of the notebook computer 200. In this way, when the icon 206 of the device B is displayed in the second area 208, the following can be more intuitively displayed: The device B located on the right side of the notebook computer 200 is connected to the notebook computer 200.

Figure 21A:
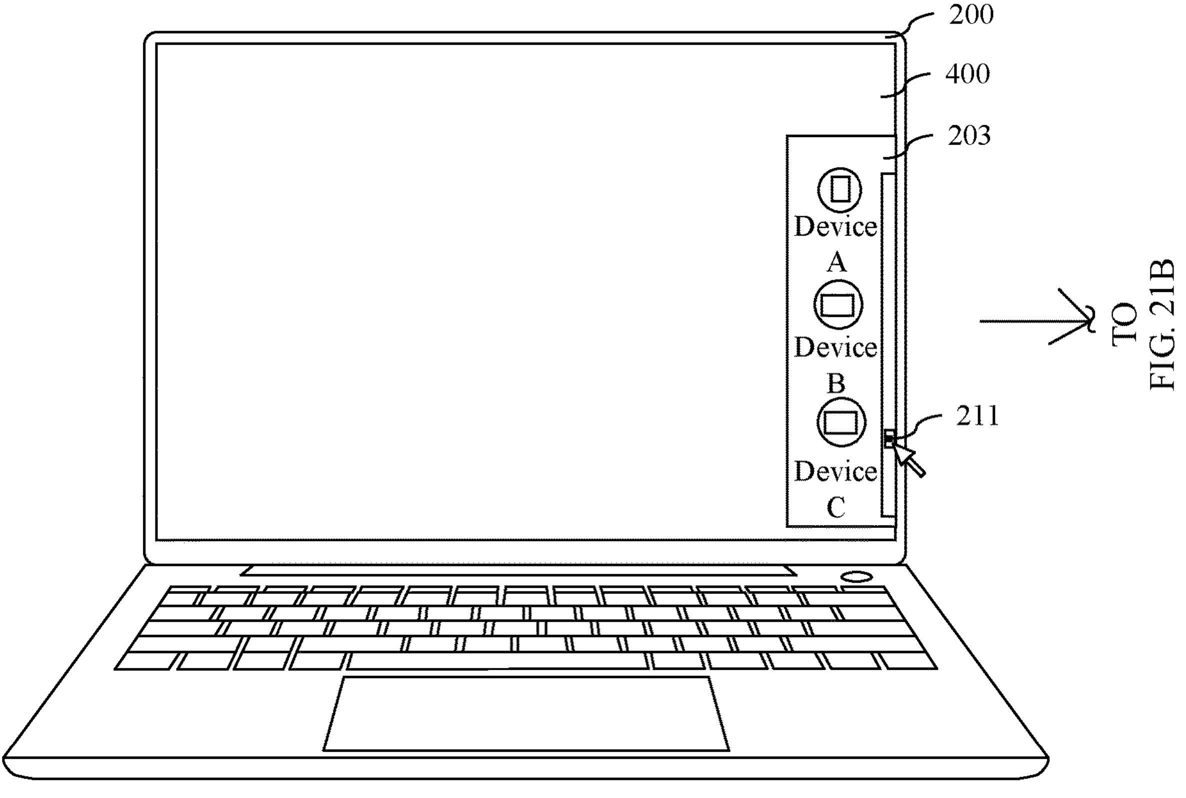
FIG. 21A and FIG. 21B are schematic diagrams of interfaces in which a notebook computer updates a device icon list in response to a tap operation on a cursor in a first interface.
Figure 21B:
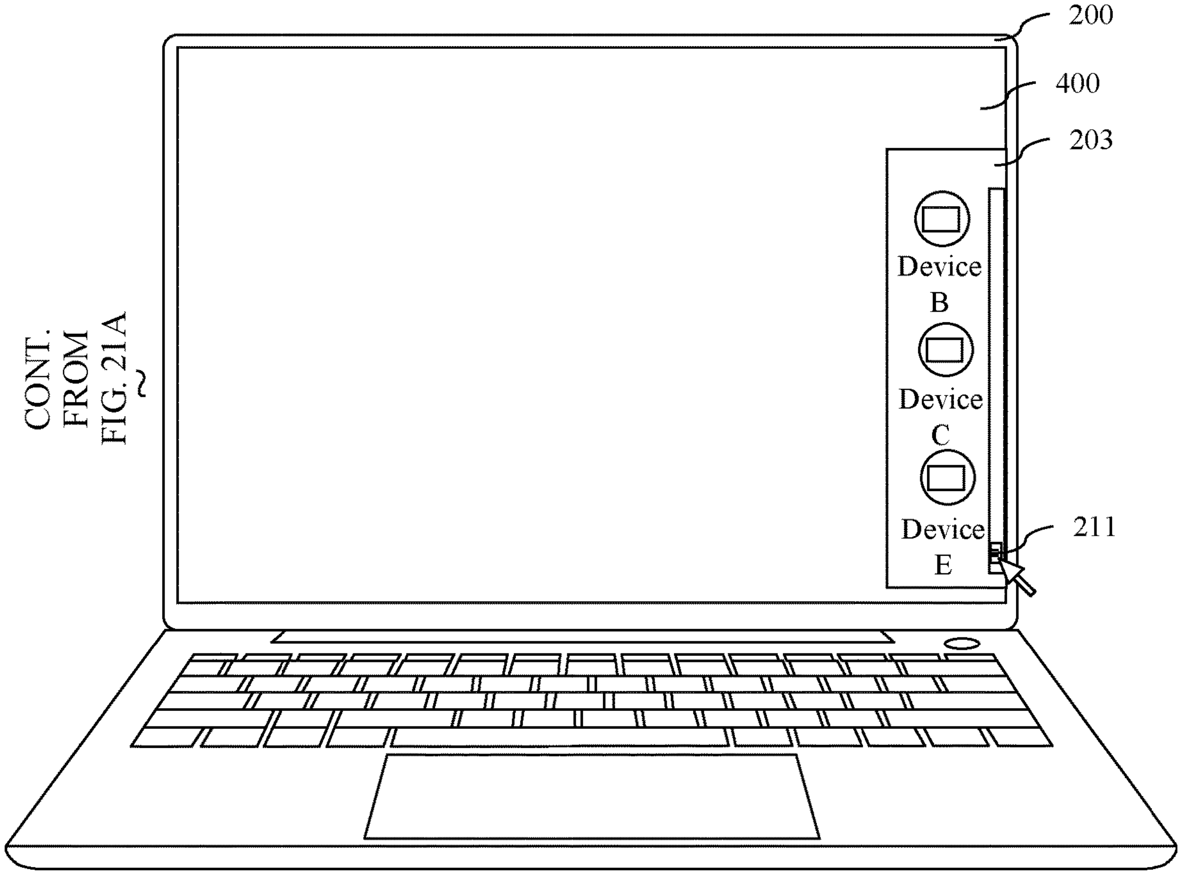

Case 2: As shown in FIG. 21A, the first interface 400 of the notebook computer 200 further includes a first control 211. The first control 211 is used to indicate to display an icon of an undisplayed device that has been discovered. In FIG. 21A and FIG. 21B, the first control 211 may be referred to as a scroll bar. As shown in FIG. 21A-FIG. 21B, the notebook computer 200 may update the device icon list 203 in response to a pull-down operation on the first control 211. An updated device icon list 203 includes the icon of the device E arranged below the icon of the device C, and the icon of the device A located above the device B disappears.

Similarly, the notebook computer 200 may update the device icon list 203 (not shown in the accompanying drawings) in response to a pull-up operation on the first control 211.

It should be noted that, in the foregoing embodiment, an example in which the mobile phone 100 and the tablet computer 300 display text input interfaces is used to describe how the notebook computer 200 shares an input device with the mobile phone 100 and the tablet computer 300. In some other embodiments, the notebook computer 200 may further share, based on a principle similar to that described above, an input device with the mobile phone 100 or the tablet computer 300 that displays a game interface, and details are not described herein again.

Figures 22, 23:
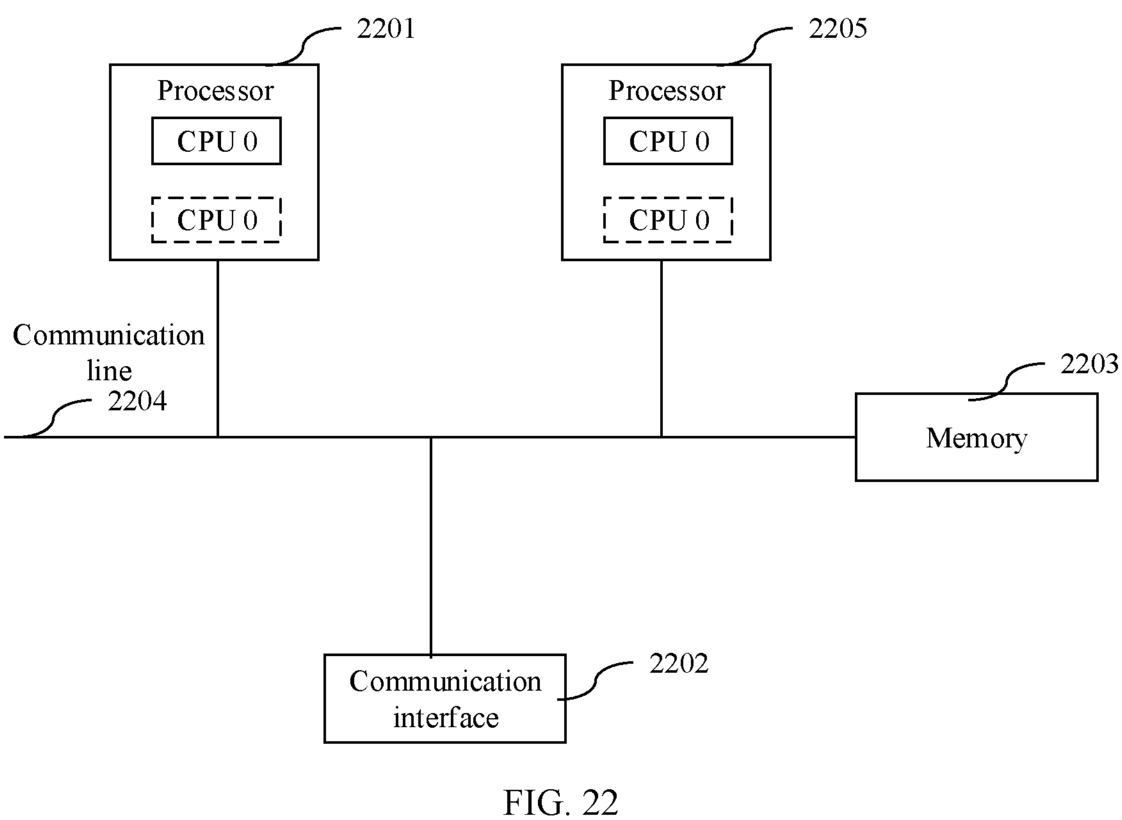
FIG. 22 is a schematic diagram of a hardware structure of a terminal device according to an embodiment of this application.
FIG. 23 is a schematic diagram of a structure of a chip according to an embodiment of this application.

For example, FIG. 22 is a schematic diagram of a hardware structure of a terminal device according to an embodiment of this application. As shown in FIG. 22, the terminal device includes a processor 2201, a communication line 2204, and at least one communication interface (in FIG. 22, a communication interface 2203 is used as an example for description).

The processor 2201 may be a general-purpose central processing unit (central processing unit, CPU), a microprocessor, an application-specific integrated circuit (application-specific integrated circuit, ASIC), or one or more integrated circuits for controlling program execution in the solutions in this application.

The communication line 2204 may include a circuit for transmitting information between the foregoing components.

The communication interface 2203 uses any apparatus such as a transceiver to communicate with another device or a communication network, such as an Ethernet or a wireless local area network (WLAN).

Possibly, the terminal device may further include a memory 2202.

The memory 2202 may be a read-only memory (ROM) or another type of static storage device capable of storing static information and instructions, a random access memory (RAM) or another type of dynamic storage device capable of storing information and instructions, or an electrically erasable programmable read-only memory (EEPROM), a compact disc read-only memory (CD-ROM) or another optical disc memory, a compact disc memory (including a compact disc, a laser disc, an optical disc, a digital versatile disc, a Blu-ray disc, and the like), a magnetic disk storage medium or another magnetic storage device, or any other medium that can be used to carry or store desired program code in a form of instructions or data structures and that can be accessed by a computer, but is not limited thereto. The memory may exist independently, and is connected to the processor by using the communication line 2204. The memory may alternatively be integrated with the processor.

The memory 2202 is configured to store computer-executable instructions for performing the solutions in this application, and the processor 2201 controls execution. The processor 2201 is configured to execute the computer-executable instructions stored in the memory 2202 to implement the method performed by the first terminal or the second terminal provided in the embodiments of this application.

Possibly, the computer-executable instructions in this embodiment of this application may also be referred to as application program code. This is not specifically limited in this embodiment of this application.

During specific implementation, in an embodiment, the processor 2201 may include one or more CPUs, such as a CPU 0 and a CPU 1 in FIG. 22.

During specific implementation, in an embodiment, the terminal device may include a plurality of processors, such as the processor 2201 and a processor 2205 in FIG. 22. Each of these processors may be a single-core (single-CPU) processor or a multi-core (multi-CPU) processor. The processor herein may be one or more devices, circuits, and/or processing cores configured to process data (for example, computer program instructions).

For example, FIG. 23 is a schematic diagram of a structure of a chip according to an embodiment of this application. A chip 230 includes one or more than two (including two) processors 2310 and a communication interface 2330.

In some implementations, a memory 2340 stores the following elements: an executable module or a data structure, or subsets thereof, or extended sets thereof.

In this embodiment of this application, the memory 2340 may include a read-only memory and a random access memory, and provide instructions and data to the processor 2310. A part of the memory 2340 may further include a non-volatile random access memory (non-volatile random access memory, NVRAM).

In this embodiment of this application, the memory 2310, the communication interface 2330, and the memory 2340 are coupled together by using a bus system 2320. The bus system 2320 may further include a power bus, a control bus, a status signal bus, and the like in addition to a data bus. For convenience of description, various buses are marked as the bus system 2320 in FIG. 23.

The method described in the embodiments of this application may be applied to the processor 2310 or implemented by the processor 2310. The processor 2310 may be an integrated circuit chip having a capability of processing a signal. During implementation, the steps of the method may be performed by using an integrated logic circuit of hardware in the processor 2310 or by using instructions in a form of software. The processor 2310 may be a general-purpose processor (for example, a microprocessor or a conventional processor), a digital signal processor (DSP), an application-specific integrated circuit (ASIC), a field-programmable gate array (FPGA) or another programmable logic device, a discrete gate, or a transistor logic device or a discrete hardware component. The processor 2310 may implement or perform the methods, steps, and logical block diagrams disclosed in the embodiments of this application.

The steps of the method disclosed in the embodiments of this application may be directly performed by a hardware decoding processor, or performed by a combination of hardware and a software module in a decoding processor. The software module may be located in a mature storage medium in the art, for example, a random access memory, a read-only memory, a programmable read-only memory, or an electrically erasable programmable memory (EEPROM). The storage medium is located in the memory 2340, and the processor 2310 reads information in the memory 2340 and completes the steps of the foregoing method in combination with hardware in the processor.

In the foregoing embodiments, the instructions stored in the memory for execution by the processor may be implemented in a form of a computer program product. The computer program product may be pre-written in the memory, or may be downloaded and installed in the memory in a form of software.

The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (digital subscriber line, DSL)) manner or a wireless (for example, infrared, radio, or microwave) manner. The computer-readable storage medium may be any available medium accessible by the computer, or a data storage device such as a server or a data center integrating one or more available media. For example, the available medium may include a magnetic medium (for example, a floppy disk, a hard disk, or a magnetic tape), an optical medium (for example, a digital versatile disc (digital versatile disc, DVD)), or a semiconductor medium (for example, a solid state disk (solid state disk, SSD)).

An embodiment of this application further provides a computer-readable storage medium. The method described in the foregoing embodiments may be completely or partially implemented by using software, hardware, firmware, or any combination thereof. The computer-readable medium may include a computer storage medium and a communication medium, and may further include any medium that enables a computer program to be transmitted from one place to another place. The storage medium may be any target medium accessible by the computer.

In a possible design, the computer-readable medium may include a compact disc read-only memory (compact disc read-only memory, CD-ROM), a RAM, a ROM, an EEPROM, or another optical disc memory; or the computer-readable medium may include a magnetic disk memory or another magnetic disk storage device. In addition, any connecting line may also be appropriately referred to as a computer-readable medium. For example, if software is transmitted from a website, a server, or another remote source by using a coaxial cable, an optical fiber cable, a twisted pair, a DSL, or wireless technologies (for example, infrared, radio, and microwave), the coaxial cable, the optical fiber cable, the twisted pair, the DSL, or the wireless technologies such as infrared, radio, and microwave are included in the definition of the medium. As used herein, a magnetic disk and an optical disc include a compact disc (CD), a laser disc, an optical disc, a digital versatile disc (digital versatile disc, DVD), a floppy disk, and a Blu-ray disc. The magnetic disk usually reproduces data in a magnetic manner, and the optical disc reproduces data optically by using laser.

The foregoing combinations should also be included in the scope of the computer-readable medium. The foregoing descriptions are merely specific implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method, applied to a system, wherein the system comprises a first terminal, a second terminal and a third terminal, and the first terminal is connected to an input device, the method comprising:

displaying, by the first terminal, a first interface that comprises a cursor;

displaying, by the second terminal, a second interface;

moving, by the first terminal, the cursor to an edge on a first side of the first interface in response to a move operation performed on the cursor toward a first direction;

discovering, by the first terminal, one or more terminals located in the first direction, in response to the move operation, wherein the one or more terminals comprise the second terminal and the third terminal;

performing, by the first terminal, priority sorting on the discovered terminals, wherein a terminal that has previously been connected to the first terminal more times has a higher priority;

displaying, by the first terminal, a first prompt information, based on the second terminal and the third terminal being located in the first direction, wherein the first prompt information comprises a second terminal icon, a third terminal icon, and a first control, and the first prompt information is used to indicate that one or more terminals have been detected; when a priority of the second terminal is higher than a priority of the third terminal, a sorting location of the second terminal icon is closer than the third terminal icon to the location of the cursor;

displaying, by the first terminal and in response to an operation applied to the first control, a third interface, wherein the third interface comprises an icon of the second terminal, an icon of the third terminal, and an icon of the first terminal, the icon of the second terminal and the icon of the third terminal being located below the icon of the first terminal; when a priority of the second terminal is higher than a priority of the third terminal, the icon of the second terminal being closer to the icon of the first terminal than the icon of the third terminal;

starting, by the first terminal, in response to an operation applied to the icon of the second terminal, to establish a short-range communication connection between the first terminal and the second terminal;

after the first terminal establishes the short-range communication connection to the second terminal, moving, by the first terminal, the icon of the second terminal to a first area, wherein the first area is located in a first direction relative to an icon of the first terminal;

after the first terminal establishes the short-range communication connection to the second terminal, displaying, by the second terminal, a second prompt information, wherein the second prompt information is displayed at an edge on a side of the second terminal in a second direction, and the second direction is opposite to the first direction, the second prompt information being used to indicate that the first terminal has established a service connection to the second terminal;

after the first terminal establishes a service connection to the second terminal, in response to an operation applied to the input device, the cursor is moved from the third interface to the second interface;

receiving, by the second terminal, when the second terminal displays the cursor on the second interface, a first operation performed by a user on an input device of the first terminal; and performing, by the second terminal, in response to the first operation, a function corresponding to the first operation.

2. The method of claim 1, wherein after identifying a direction of the second terminal relative to the first terminal, the method further comprises skipping starting to establish the short-range communication connection to the second terminal when the second terminal is located in a second direction.

3. The method of claim 1, wherein starting to establish the short-range communication connection to the second terminal comprises:

displaying, when the first direction comprises a plurality of second terminals, identifiers of the plurality of second terminals in the first interface of the first terminal;

receiving a trigger operation on a first identifier in the identifiers of the plurality of second terminals; and starting, in response to the trigger operation, to establish the short-range communication connection to the second terminal of the plurality that corresponds to the first identifier.

4. The method of claim 3, wherein displaying identifiers of the plurality of second terminals in the first interface of the first terminal comprises:

sorting locations of the identifiers of the second terminals based on priorities of the second terminals, wherein a sorting location of a terminal of the second terminals with a relatively higher priority is closer to a middle of a list of the identifiers, or a sorting location of the terminal of the second terminals with a relatively higher priority is closer to a location of the cursor; and displaying the identifiers of the plurality of second terminals in the first interface of the first terminal based on the sorting.

5. The method of claim 4, wherein before sorting the locations of the identifiers of the second terminals, the method further comprises performing priority sorting on the second terminals, wherein a rule of the priority sorting is that a first second terminal that is connected to the first terminal at an earlier moment previously than a second second terminal has a higher priority than the second second terminal, or that a first second terminal that has been previously connected to the first terminal more times than a second second terminal has a higher priority than the second second terminal.

6. The method of claim 1, wherein after the second terminal displays the cursor in the second interface, the first terminal controls the first prompt information to disappear, and the second terminal controls the second prompt information to disappear.

7. The method of claim 1, wherein the first prompt information is a first brightness bar, and the second prompt information is a second brightness bar.

8. The method of claim 1, wherein the input device is a keyboard, a mouse, or a touchpad.

9. A system, comprising:

a first terminal connected to an input device configured to input a control instruction, wherein the first terminal is configured to display a first interface comprising a cursor;

a second terminal configured to display a second interface; and a third terminal, wherein the first terminal is configured to:

move, according to a move operation, the cursor to an edge on a first side of the first interface in response to a move operation performed on the cursor toward a first direction;

discover one or more terminals located in the first direction in response to the move operation, wherein the one or more terminals comprise the second terminal and the third terminal;

perform priority sorting on the discovered terminals, wherein a terminal that has previously been connected to the first terminal more times has a higher priority:

display a first prompt information, based on the second terminal and the third terminal being located in the first direction, wherein the first prompt information comprises a second terminal icon, a third terminal icon, and a first control, and the first prompt information is used to indicate that one or more terminals have been detected; when a priority of the second terminal is higher than a priority of the third terminal, a sorting location of the second terminal icon is closer than the third terminal icon to the location of the cursor;

display, in response to an operation applied to the first control, a third interface, wherein the third interface comprises an icon of the second terminal, an icon of the third terminal, and an icon of the first terminal, the icon of the second terminal and the icon of the third terminal being located below the icon of the first terminal; when a priority of the second terminal is higher than a priority of the third terminal, the icon of the second terminal being closer to the icon of the first terminal than the icon of the third terminal;

start, in response to an operation applied to the icon of the second terminal, to establish a short-range communication connection between the first terminal and the second terminal; and after the first terminal establishes the short-range communication connection to the second terminal, move the icon of the second terminal to a first area, wherein the first area is located in a first direction relative to an icon of the first terminal;

wherein the second terminal is configured to:

after the short-range communication connection is established with the first terminal, display a second prompt information, wherein the second prompt information is displayed at an edge on a side of the second terminal in a second direction, and the second direction is opposite to the first direction, the second prompt information being used to indicate that the first terminal has established a service connection to the second terminal;

after the first terminal establishes a service connection to the second terminal, in response to an operation applied to the input device, the cursor is moved from the third interface to the second interface;

receiving, by the second terminal, when the second terminal displays the cursor on the second interface, a first operation performed by a user on an input device of the first terminal; and performing, by the second terminal, in response to the first operation, a function corresponding to the first operation.

10. The system of claim 9, wherein after the first terminal identifies a direction of the second terminal relative to the first terminal, the first terminal is further configured to skip starting to establish the short-range communication connection to the second terminal device when the second terminal is located in a second direction.

11. The system of claim 9, wherein the first terminal being configured to start to establish a short-range communication connection to the second terminal comprises the first terminal being further configured to:

display, when the first direction comprises a plurality of second terminals, identifiers of the plurality of second terminals in the first interface of the first terminal;

receive a trigger operation on a first identifier in the identifiers of the plurality of second terminals; and start, in response to the trigger operation, to establish the short-range communication connection to the second terminal of the plurality that corresponds to the first identifier.

12. The system of claim 11, wherein the first terminal is further configured to:

sort locations of the identifiers of the second terminals based on priorities of the terminals, wherein a sorting location of a terminal of the second terminals with a relatively higher priority is closer to a middle of a list of the identifiers, or a sorting location of the terminal of the second terminals with a relatively higher priority is closer to a location of the cursor; and display the identifiers of the plurality of second terminals in the first interface of the first terminal based on the sorting.

13. The system of claim 12, wherein before the first terminal sorts the locations of the identifiers of the second terminals, the first terminal is further configured to perform priority sorting on the second terminals, wherein a rule of the priority sorting is that a first second terminal that is connected to the first terminal at an earlier moment previously than a second second terminal has a higher priority than the second second terminal, or that a first second terminal that has been previously connected to the first terminal more times than a second second terminal has a higher priority than the second second terminal.

14. The system of claim 9, wherein after the second terminal displays the cursor in the second interface, the first terminal controls the first prompt information to disappear, and the second terminal controls the second prompt information to disappear.

15. The system of claim 9, wherein the first prompt information is a first brightness bar, and the second prompt information is a second brightness bar.

16. The system of claim 9, wherein the input device is a keyboard, a mouse, or a touchpad.

17. A non-transitory computer-readable medium storing instructions that, when executed by one or more processors of a first terminal, cause the first terminal to be configured to:

move, according to a move operation, a cursor to an edge on a first side of the first interface in response to a move operation performed on the cursor toward a first direction;

discover one or more terminals located in the first direction in response to the move operation, wherein the one or more terminals comprise a second terminal and a third terminal;

perform priority sorting on the discovered terminals, wherein a terminal that has previously been connected to the first terminal more times has a higher priority;

display a first prompt information, based on the second terminal and the third terminal being located in the first direction, wherein the first prompt information comprises a second terminal icon, a third terminal icon, and a first control, and the first prompt information is used to indicate that one or more terminals have been detected; when a priority of the second terminal is higher than a priority of the third terminal, a sorting location of the second terminal icon is closer than the third terminal icon to the location of the cursor;

display, in response to an operation applied to the first control, a third interface, wherein the third interface comprises an icon of the second terminal, an icon of the third terminal, and an icon of the first terminal, the icon of the second terminal and the icon of the third terminal being located below the icon of the first terminal; when a priority of the second terminal is higher than a priority of the third terminal, the icon of the second terminal being closer to the icon of the first terminal than the icon of the third terminal;

start, in response to an operation applied to the icon of the second terminal, to establish a short-range communication connection between the first terminal and the second terminal; and after the first terminal establishes the short-range communication connection to the second terminal, move the icon of the second terminal to a first area, wherein the first area is located in a first direction relative to an icon of the first terminal.

18. The non-transitory computer-readable medium of claim 17, wherein the instructions, when executed by the one or more processors, further cause the first terminal to be configured to, after the first terminal identifies the direction of the second terminal relative to the first terminal, skip starting to establish the short-range communication connection to the second terminal when the second terminal is located on a second side of the first terminal.

* * * * *